(12) United States Patent
Tanaka

(10) Patent No.: US 10,322,769 B2
(45) Date of Patent: Jun. 18, 2019

(54) SADDLE RIDING VEHICLE

(71) Applicant: YAMAHA HATSUDOKI KABUSHIKI KAISHA, Iwata-shi, Shizuoka-ken (JP)

(72) Inventor: Hiroshi Tanaka, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 176 days.

(21) Appl. No.: 15/548,818

(22) PCT Filed: Feb. 2, 2016

(86) PCT No.: PCT/JP2016/053051
§ 371 (c)(1),
(2) Date: Aug. 4, 2017

(87) PCT Pub. No.: WO2016/125789
PCT Pub. Date: Aug. 11, 2016

(65) Prior Publication Data
US 2018/0015986 A1    Jan. 18, 2018

(30) Foreign Application Priority Data
Feb. 6, 2015   (JP) ................................. 2015-022373

(51) Int. Cl.
*B62M 6/50*    (2010.01)
*B62M 6/45*    (2010.01)
(Continued)

(52) U.S. Cl.
CPC ............... *B62M 6/50* (2013.01); *B60L 15/20* (2013.01); *B62M 6/45* (2013.01); *B62M 6/65* (2013.01);
(Continued)

(58) Field of Classification Search
CPC . B62M 6/50; B62M 6/60; B62M 6/45; B62M 7/12; B60L 15/20; B60L 15/2054;
(Continued)

(56) References Cited

U.S. PATENT DOCUMENTS

2011/0292667 A1    12/2011   Meyers
2013/0311019 A1*   11/2013   Tanaka ................. B62M 6/45
                                                              701/22
(Continued)

FOREIGN PATENT DOCUMENTS

JP    H03-167901 A    7/1991
JP    H09-301264 A   11/1997
(Continued)

*Primary Examiner* — Joseph M Rocca
*Assistant Examiner* — Daniel S Yeagley
(74) *Attorney, Agent, or Firm* — Rabin & Berdo, P.C.

(57) ABSTRACT

A straddled vehicle includes a straddled vehicle body, a front wheel that supports the vehicle body, a rear wheel that supports the vehicle body, a front wheel electric motor that imparts a driving force to the front wheel, a rear wheel electric motor that imparts a driving force to the rear wheel, a front wheel motor drive unit that drives the front wheel electric motor, a rear wheel motor drive unit that drives the rear wheel electric motor, and a control unit. The control unit is programmed to provide a front wheel drive command to the front wheel motor drive unit and to provide a rear wheel drive command, differing from the front wheel drive command, to the rear wheel motor drive unit so as to provide a time difference in changes of the driving forces of the front wheel electric motor and the rear wheel electric motor.

20 Claims, 17 Drawing Sheets

(51) Int. Cl.
  *B60L 15/20* (2006.01)
  *B62M 6/70* (2010.01)
  *B62M 6/75* (2010.01)
  *B62M 9/02* (2006.01)
  *B62M 6/65* (2010.01)
  *B62M 7/12* (2006.01)
  *B62M 6/55* (2010.01)
  *B62M 6/90* (2010.01)

(52) U.S. Cl.
  CPC ............... *B62M 6/70* (2013.01); *B62M 6/75* (2013.01); *B62M 7/12* (2013.01); *B62M 9/02* (2013.01); *B60L 2200/12* (2013.01); *B60L 2240/14* (2013.01); *B60L 2240/463* (2013.01); *B62K 2204/00* (2013.01); *B62M 6/55* (2013.01); *B62M 6/90* (2013.01); *Y02T 10/645* (2013.01); *Y02T 10/72* (2013.01); *Y02T 10/7275* (2013.01)

(58) Field of Classification Search
  CPC ......... B60L 50/20; B60L 50/16; B60W 20/13; B60W 20/00; B60W 20/10; B60W 30/18145; B60W 30/045; B60W 10/08; B60W 10/06; B60K 6/48
  USPC ........................................................ 701/22
  See application file for complete search history.

(56) References Cited

U.S. PATENT DOCUMENTS

| | | | |
|---|---|---|---|
| 2013/0317679 A1* | 11/2013 | Tanaka | B62M 6/45 701/22 |
| 2014/0039742 A1* | 2/2014 | Tanaka | H02P 6/085 701/22 |
| 2015/0136509 A1* | 5/2015 | Tanaka | B62M 6/50 180/206.3 |
| 2017/0129495 A1* | 5/2017 | Eguchi | B60W 20/13 |

FOREIGN PATENT DOCUMENTS

| | | |
|---|---|---|
| JP | 2000-006874 A | 1/2000 |
| JP | 2007-112406 A | 5/2007 |
| JP | 2007-210608 A | 8/2007 |
| JP | 2013-533821 A | 8/2013 |
| JP | 2015-098227 A | 5/2015 |

* cited by examiner

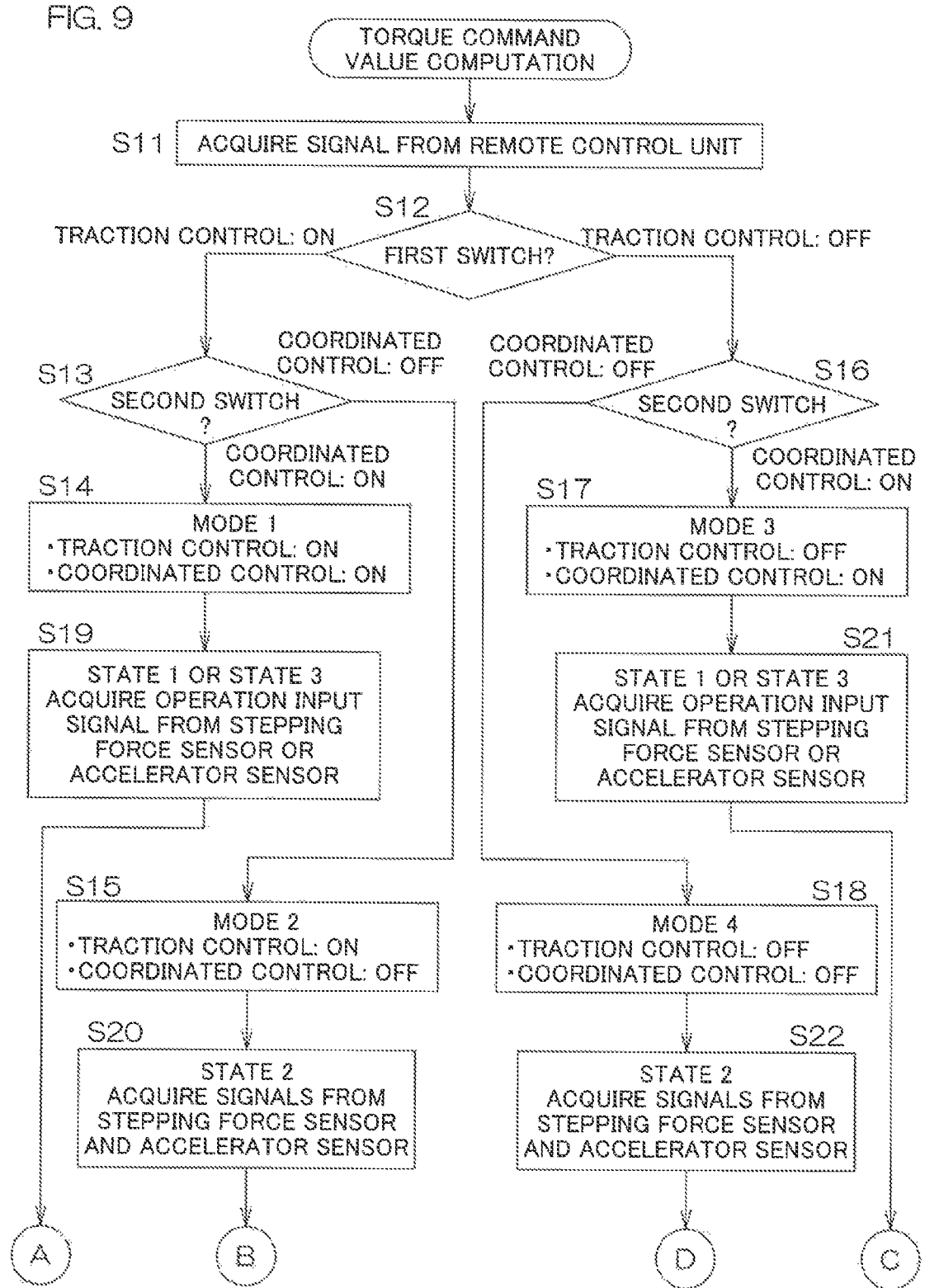

SADDLE RIDING VEHICLE

CROSS-REFERENCE TO RELATED APPLICATIONS

The present application corresponds to Japanese Patent Application No. 2015-022373 filed on Feb. 6, 2015, in the Japan Patent Office, and the entire disclosure of this application is incorporated herein by reference.

BACKGROUND ART

Patent Document 1 discloses an electric bicycle that includes a vehicle body, a front wheel, a rear wheel, a front wheel electric motor, and a rear wheel electric motor. The electric bicycle is arranged to enable selection among travel patterns of "OFF," "rear wheel drive," "front wheel drive," and "front and rear wheel drive." "OFF" is a travel pattern in which electric power is not supplied to either of the front wheel electric motor and the rear wheel electric motor. "Rear wheel drive" is a pattern of travel as a power-assisted bicycle, and by making the electric bicycle travel by stepping on foot-pedals, electric power is supplied to the rear wheel electric motor in correspondence to the torque applied to a crankshaft. "Front wheel drive" is a drive pattern with which electricity is fed to the front wheel electric motor in correspondence to an operation position of a shift operation switch but electricity is not fed to the rear wheel electric motor. "Front and rear wheel drive" is a travel mode with which road travelling performance is enhanced by feeding electricity to the front wheel electric motor and the rear wheel electric motor and there is no relationship between the pedal effort applied to the foot-pedals and the supplying of electricity to the rear wheel electric motor.

PRIOR ART DOCUMENT

Patent Literature

[Patent Literature 1] Japanese Patent Application Publication No. 2007-112406

SUMMARY OF THE INVENTION

With the electric bicycle of Patent Document 1, during the "front and rear wheel drive," the front wheel electric motor and the rear wheel electric motor are driven similarly, and consequently, the electric bicycle is pushed from the rear by the rear wheel while the electric bicycle is pulled forward by the front wheel. Excellent road travelling performance is thereby exhibited even on bad roads, such as snowy roads, gravel roads, etc.

However, according to latest research by the present inventor, there are also cases where travelling performance is made rather worse by the front wheel and the rear wheel being driven similarly. For example, when traveling on a rough road, such as off-road, etc., there are cases where it is desired to drive a vehicle forward over an obstacle. With a bicycle that does not include an electric motor for propulsion, a user (rider) steps on the pedals while lifting the front wheel to raise the front wheel off the ground and ride on the obstacle, and can thereby ride over the obstacle.

However, with the "front and rear wheel drive" of Patent Document 1, even if an attempt is made to lift the front wheel, the front wheel will not be raised easily. This is because the front wheel is pulling the vehicle body toward the front and therefore it is not easy to make a forward drive of the front wheel lag in comparison to a forward drive of the rear wheel. Therefore with the electric bicycle of Patent Document 1, an obstacle cannot be ridden over with the "front and rear wheel drive" which provides the electric bicycle with a high road travelling performance, and there is thus a limit to road surface circumstances under which the electric bicycle can travel through.

There are also cases besides the case mentioned above in which, due to the front and rear wheels being driven similarly, a driving force desired by the user is not exhibited in the "front and rear wheel drive" of Patent Document 1.

A embodiment of the present invention provides a straddled vehicle including a straddled vehicle body, a front wheel that supports the vehicle body, a rear wheel that supports the vehicle body, a front wheel electric motor that imparts a driving force to the front wheel, a rear wheel electric motor that imparts a driving force to the rear wheel, a front wheel motor drive unit that drives the front wheel electric motor, a rear wheel motor drive unit that drives the rear wheel electric motor, and a control unit programmed to provide a front wheel drive command to the front wheel motor drive unit and provide a rear wheel drive command, differing from the front wheel drive command, to the rear wheel motor drive unit to provide a time difference in changes of the driving forces of the front wheel electric motor and the rear wheel electric motor.

With the present configuration, the front wheel can be driven by the front wheel electric motor and the rear wheel can be driven by the rear wheel electric motor. The front wheel electric motor and the rear wheel electric motor are driven by the front wheel motor drive unit and the rear wheel motor drive unit, respectively. The control unit is capable of providing the front wheel drive command and the rear wheel drive command to the front wheel motor drive unit and the rear wheel motor drive unit, respectively, so as to provide the time difference in changes of the driving forces of the front wheel electric motor and the rear wheel electric motor. A timing of change of the front wheel driving force and a timing of change of the rear wheel driving force can thereby be shifted to enable the front wheel and rear wheel driving forces to change respectively at appropriate timings. Traveling performance can thereby be improved.

In an embodiment of the present invention, the control unit is programmed to generate the front wheel drive command and the rear wheel drive command so that the change of the driving force of the front wheel electric motor occurs with delay after the change of the driving force of the rear wheel electric motor.

With the present arrangement, the rear wheel driving force changes and with delay thereafter, the front wheel driving force changes. The ground-covering ability can thereby be improved.

More specifically, the control unit may be programmed to generate the front wheel drive command and the rear wheel drive command so that an increase of the driving force of the front wheel electric motor occurs with delay after an increase of the driving force of the rear wheel electric motor. In this case, to ride over an obstacle, the front wheel can be lifted to ride on the obstacle in an interval until the front wheel driving force is increased after the rear wheel driving force is increased. Thereafter, the driving force of the front wheel increases so that the front wheel pulls the vehicle body. The vehicle can thereby be made to ride over the obstacle and advance. By the driving force of the front wheel not being increased when the front wheel is lifted, the front wheel is made easy to lift. It is thus easy to ride over the obstacle.

In an embodiment of the present invention, the control unit is programmed to generate the front wheel drive command and the rear wheel drive command so that the driving force of the front wheel electric motor is generated with delay after driving force generation of the rear wheel electric motor.

With the present arrangement, the rear wheel driving force is generated and with delay thereafter, the front wheel driving force is generated. The ground-covering ability can thereby be improved. Specifically, to ride over an obstacle, the front wheel can be lifted to ride on the obstacle in an interval until the front wheel driving force is generated after the rear wheel driving force is generated. Thereafter, the driving force of the front wheel generated so that the front wheel pulls the vehicle body. The vehicle can thereby be made to ride over the obstacle and advance. By the driving force of the front wheel not being generated when the front wheel is lifted, the front wheel is made easy to lift. It is thus easy to ride over the obstacle.

In an embodiment of the present invention, the straddled vehicle further includes a front wheel input unit that is operated by a user and that outputs a signal corresponding to the operation, and a rear wheel input unit that is operated by the user and that outputs a signal corresponding to the operation. The control unit is programmed to generate the front wheel drive command in correspondence to the input from the front wheel input unit and generate the rear wheel drive command in correspondence to the input from the rear wheel input unit.

With the present arrangement, the front wheel drive command, corresponding to the operation of the front wheel input unit, is generated and the rear wheel drive command, corresponding to the rear wheel input unit, is generated.

The control unit may change the front wheel driving force and the rear wheel driving force respectively at timings corresponding to operations of the front wheel input unit and the rear wheel input unit. More specifically, the control unit may increase the front wheel driving force and the rear wheel driving force respectively at timings corresponding to operations of the front wheel input unit and the rear wheel input unit. In this case, for example, to ride over an obstacle, the user operates the rear wheel input unit to generate or increase the rear wheel driving force and, on the other hand, the front wheel input unit is put in an operation state of not generating or not increasing the front wheel driving force. In this state, the user can easily lift the front wheel and make the vehicle move toward the obstacle by the rear wheel driving force and can thereby make the front wheel ride on the obstacle. When the user thereafter operates the front wheel input unit to make the front wheel driving force be generated or increased, the front wheel pulls the vehicle body so that the vehicle can ride over the obstacle.

Also, the control unit, may, in response to operations of the front wheel input unit and the rear wheel input unit, provide a time difference, determined in advance, in changes of the driving forces of the front wheel electric motor and the rear wheel electric motor without dependence on the timings of the operations. For example, when both the front wheel input unit and the rear wheel input unit are operated at the same time or within a fixed time, the control unit may provide the time difference, determined in advance, in changes of the driving forces of the front wheel electric motor and the rear wheel electric motor.

In an embodiment of the present invention, the rear wheel input unit includes a pedal that is stepped on by the user, and a stepping force sensor that detects a stepping force applied to the pedal and outputs a signal corresponding to the stepping force. The straddled vehicle further includes a human powered drive mechanism that transmits the stepping force, applied to the pedal, to the rear wheel.

With the present arrangement, the stepping force that the user applied to the pedal is transmitted to the rear wheel by the human powered drive mechanism. The stepping force sensor that detects the stepping force is used as the rear wheel input unit. That is, the rear wheel drive command corresponding to the stepping force that the user applied to the pedal is generated. In this case, the rear wheel electric motor imparts an assist force, for assisting the stepping force of the user, to the rear wheel. A time difference is provided between the change of the rear wheel driving force, corresponding to the stepping force, and the change of the front wheel driving force, and therefore appropriate driving forces can be imparted at appropriate timings to the front wheel and the rear wheel in correspondence to circumstances of a traveling road, etc., and the traveling performance of the vehicle can thereby be improved.

In an embodiment of the present invention, the control unit is programmed to generate the front wheel drive command and the rear wheel drive command so that by the user operating the front wheel input unit with delay after an operation of the rear wheel input unit, the change of the driving force of the front wheel electric motor occurs with delay after the change of the driving force of the rear wheel electric motor in correspondence to the operations.

With the present arrangement, when the user operates the rear wheel input unit and thereafter operates the front wheel input unit, the rear wheel driving force changes and thereafter the front wheel driving force changes.

For example, the control unit may be programmed to generate the front wheel drive command and the rear wheel drive command so that by the user operating the front wheel input unit with delay after an operation of the rear wheel input unit, an increase of the driving force of the front wheel electric motor occurs with delay after an increase of the driving force of the rear wheel electric motor in correspondence to the operations. In this case, the user can easily lift the front wheel and make it ride on an obstacle in an interval until the front wheel driving force increases. When the front wheel driving force increases thereafter, the vehicle body is pulled by the front wheel and the obstacle can thus be ridden over.

The control unit may be programmed to provide a time difference, determined in advance, in changes of the driving forces of the front wheel electric motor and the rear wheel electric motor when both the front wheel input unit and the rear wheel input unit are operated at the same time or within a fixed time. If an operation of the front wheel input unit is delayed beyond the fixed time from the operation of the rear wheel input unit, the control unit may change the rear wheel driving force and the front wheel driving force successively with a time difference corresponding to the operation delay time.

In an embodiment of the present invention, the control unit is programmed to generate the front wheel drive command and the rear wheel drive command so that by the user operating the front wheel input unit with delay after an operation of the rear wheel input unit, the driving force of the front wheel electric motor is generated with delay after driving force generation of the rear wheel electric motor in correspondence to the operations.

With the present arrangement, when the user operates the rear wheel input unit and thereafter operates the front wheel input unit, the rear wheel driving force is generated and thereafter the front wheel driving force is generated. The user can thus easily lift the front wheel and make it ride on an obstacle in an interval until the front wheel driving force generates. When the front wheel driving force is generated thereafter, the vehicle body is pulled by the front wheel and the obstacle can thus be ridden over.

In an embodiment of the present invention, the control unit has an individual control mode and a common control mode and is programmed to generate the front wheel drive command in correspondence to an input from the front wheel input unit and generate the rear wheel drive command in correspondence to an input from the rear wheel input unit in the individual control mode, and to generate the front wheel drive command and the rear wheel drive command in correspondence to the input from one of the front wheel input unit and the rear wheel input unit in the common control mode. The straddled vehicle further includes a mode switching operation unit that is operated by the user and that switches between the individual control mode and the common control mode.

With the present arrangement, switching can be performed between the individual control mode, in which the front wheel driving force and the rear wheel driving force can be controlled individually by the front wheel input unit and the rear wheel input unit, and the common control mode, in which the front wheel driving force and the rear wheel driving force can be controlled in common from an input from one of the input units. The appropriate control mode can thereby be selected in correspondence to circumstances of the traveling road, etc., and the traveling performance can thus be improved further.

In an embodiment of the present invention, the straddled vehicle further includes an input unit that is operated by the user and that outputs a signal in correspondence to the operation. The control unit is programmed to generate the front wheel drive command and the rear wheel drive command so as to provide a time difference in changes of the driving forces of the front wheel electric motor and the rear wheel electric motor in correspondence to the input from the input unit.

With the present arrangement, a time difference can be provided by the control unit in changes of the front wheel driving force and the rear wheel driving force when the user operates the input unit. The traveling performance can thereby be improved.

The input unit may be an input unit used in common to increase/decrease the driving forces of the front wheel and the rear wheel. More specifically, the input unit may be a single unit arranged to increase/decrease the driving forces of the front wheel electric motor and the rear wheel electric motor.

For example, the control unit may be programmed so that in response to an operation of the input unit by the user, the rear wheel driving force is increased and after a subsequent lapse of time, the front wheel driving force is increased. Also, the control unit may be programmed so that in response to an operation of the input unit by the user, the rear wheel driving force is generated and after a subsequent lapse of time, the front wheel driving force is generated. With these arrangements, the user can easily lift the front wheel in an interval until the front wheel driving force is increased or generated and an obstacle can thus be ridden over.

In an embodiment of the present invention, the control unit has a synchronized drive mode and a time difference drive mode. In the synchronized drive mode, the control unit generates the front wheel drive command and the rear wheel drive command so that changes of the driving forces of the front wheel electric motor and the rear wheel electric motor occur in synchronization in correspondence to an input from the input unit. In the time difference drive mode, the control unit generates the front wheel drive command and the rear wheel drive command so as to provide a time difference in changes of the driving forces of the front wheel electric motor and the rear wheel electric motor in correspondence to an input from the input unit. The straddled vehicle further includes a mode switching operation unit that is operated by the user and that switches between the synchronized drive mode and the time difference drive mode.

With the present arrangement, switching can be performed between the synchronized drive mode, in which the front wheel driving force and the rear wheel driving force change in synchronization, and the time difference drive mode, in which a time difference occurs in changes of the front wheel driving force and the rear wheel driving force. The appropriate control mode can thereby be selected in correspondence to circumstances of the traveling road, etc. and the traveling performance can thus be improved further.

In an embodiment of the present invention, the straddled vehicle further includes a time difference adjusting unit, operated by the user to adjust the time difference. The control unit is programmed to variably set the time difference in correspondence to a time difference command signal input from the time difference adjusting unit.

With the present arrangement, the time difference between a change of the front wheel driving force and a change of the rear wheel driving force can be adjusted by operation of the time difference adjusting unit. Usability is thereby improved and changes of the front wheel driving force and the rear wheel driving force can be made to occur with a time difference that is in correspondence to the user's choice or circumstances of the traveling road.

The above and other elements, features, steps, characteristics, and advantages of the present invention will become more apparent from the following detailed description of the embodiments with reference to the attached drawings.

BRIEF DESCRIPTION OF THE DRAWINGS

FIG. 9 is a flowchart for describing an example of control of a front wheel electric motor and a rear wheel electric motor.

DETAILED DESCRIPTION OF THE INVENTION

Embodiments of the present invention shall now be described in detail with reference to the attached drawings.

First Embodiment

Figure 1:
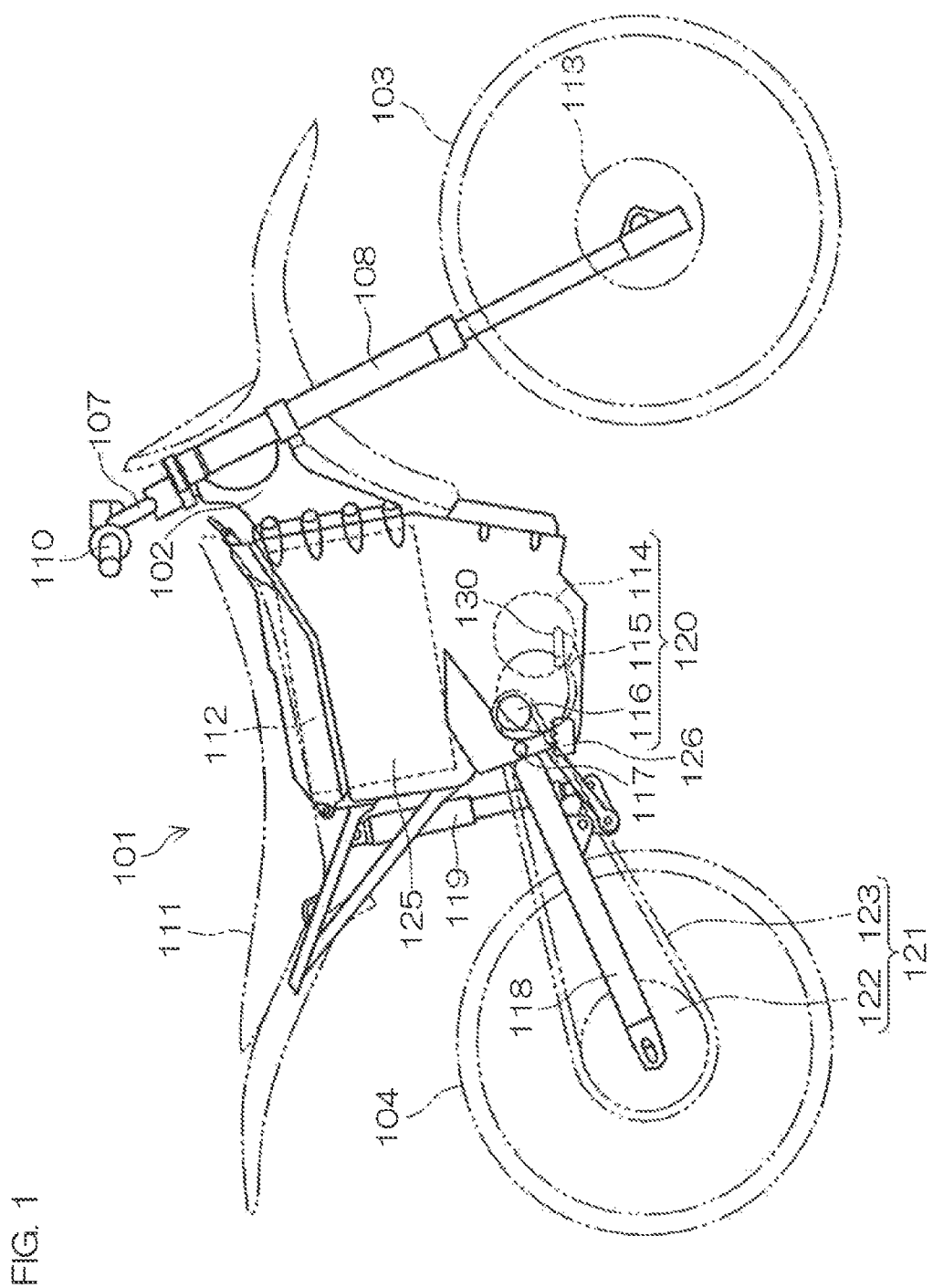
FIG. 1 is a side view for describing the arrangement of an electric two-wheeled vehicle according to a first embodiment of the present invention.

FIG. 1 is a side view for describing the arrangement of an electric two-wheeled vehicle, which is a straddled vehicle according to a first embodiment of the present invention. In the description that follows, front, rear, right, and left directions shall refer to directions as viewed by a driver (rider) sitting on a seat. That is, a right side surface of the electric two-wheeled vehicle 101 is shown in FIG. 1.

The electric two-wheeled vehicle 101 includes a vehicle body frame 102, which is a straddled vehicle body frame, and a front wheel 103 and a rear wheel 104 that support the vehicle body frame 102. An unillustrated steering shaft is rotatably mounted to a front portion of the vehicle body frame 102. A handlebar 107 and a pair of front forks 108 are coupled to the steering shaft. Grips 110, which a user grips with right and left hands, are provided at the right and left of the handlebar 107. For example, the right grip 110 is an accelerator grip that is pivotably coupled to a handle shaft and is operated by the user. The front wheel 103 is mounted rotatably to a lower end portion of the pair of front forks 108. A front wheel electric motor 113, arranged to drive the front wheel 103, is incorporated in a hub of the front wheel 103.

A seat 111, on which the user straddles and sits, is mounted on an upper portion of the vehicle body frame 102. A pivot shaft 117 is provided at a rear lower portion of the vehicle body frame 102, and a rear arm 118 is mounted so as to be swingable in the up/down direction to the pivot shaft 117. The rear wheel 104 is rotatably mounted to a rear end portion of the rear arm 118. A cushion unit 119 is disposed between the rear arm 118 and an upper portion of the vehicle body frame 102.

The vehicle body frame 102 holds a motive power unit 120 in front of the cushion unit 119. The motive power unit 120 includes a rear wheel electric motor 114, a motive power transmission gear 115, and a drive sprocket 116. A driving force of the rear wheel electric motor 114 is transmitted to the rear wheel 104 via the motive power transmission gear 115, the drive sprocket 116 and a motive power transmission mechanism 121. The motive power transmission mechanism 121 includes a driven sprocket 122, fixed to the rear wheel 104, and an endless chain 123. The chain 123 is wound around the drive sprocket 116 and the driven sprocket 122.

A battery 112, supplying electric power to the front wheel electric motor 113 and the rear wheel electric motor 114, is disposed above the power unit 120. The battery 112 is supported by a battery supporting member 125, coupled to the vehicle body frame 102, and is positioned below the seat 111.

Right and left footrests 126 are disposed at the right and left of a lower portion of the vehicle frame 102. For example, an accelerator pedal 130, operable by the user's right foot, is disposed near the right footrest 126.

Figure 2:
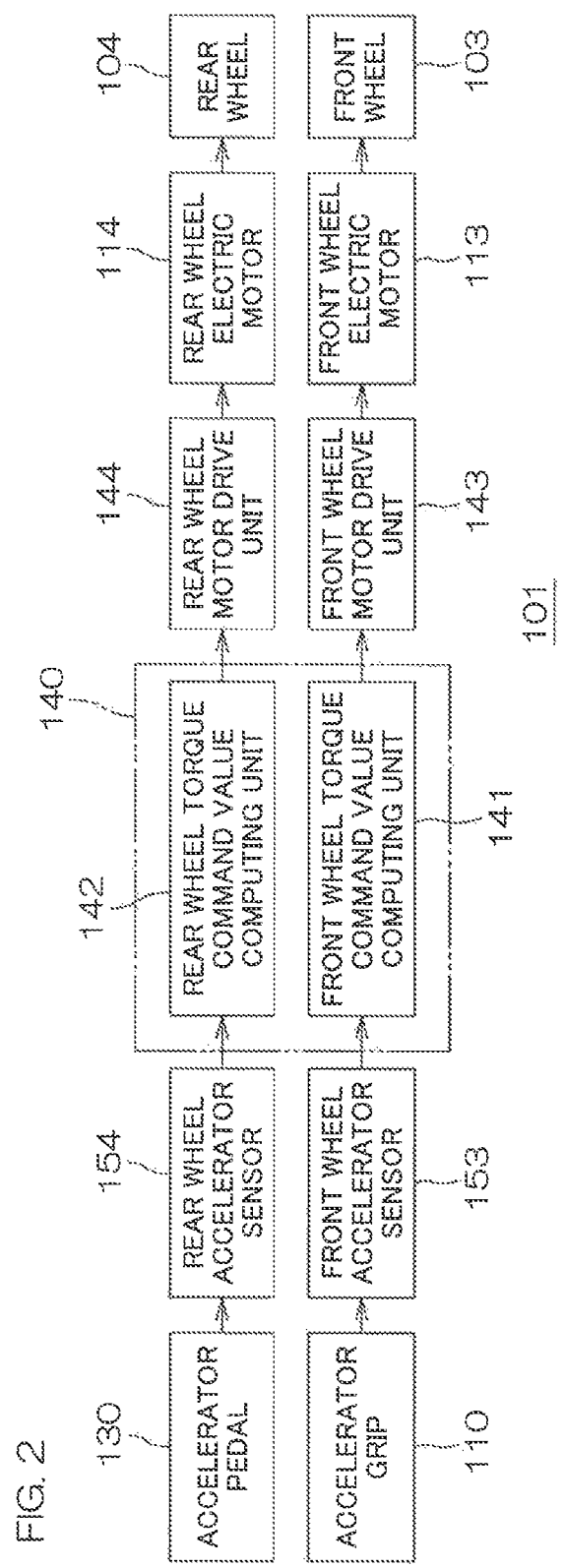
FIG. 2 is a block diagram for describing the electrical arrangement of the electric two-wheeled vehicle.

FIG. 2 is a block diagram for describing the electrical arrangement of the electric two-wheeled vehicle 101. The electric two-wheeled vehicle 101 includes a control unit 140, a front wheel motor drive unit 143 and a rear wheel motor drive unit 144.

An output signal of a front wheel accelerator sensor 153 and an output signal of a rear wheel accelerator sensor 154 are input into the control unit 140. The front wheel accelerator sensor 153 detects an operation amount of the accelerator grip 110 and outputs a signal expressing the operation amount. The accelerator grip 110 and the front wheel accelerator sensor 153 constitute an example of a front wheel input unit. The rear wheel accelerator sensor 154 detects an operation amount of the accelerator pedal 130 and outputs a signal expressing the operation amount. The accelerator pedal 130 and the rear wheel accelerator sensor 154 constitute an example of a rear wheel input unit.

The control unit 140 includes a front wheel torque command value computing unit 141 and a rear wheel torque command value computing unit 142. The front wheel torque command value computing unit 141 computes, based on the output of the front wheel accelerator sensor 153, a command value of a front wheel torque to be generated by the front wheel electric motor 113. The rear wheel torque command value computing unit 142 computes, based on the output of the rear wheel accelerator sensor 154, a command value of a rear wheel torque to be generated by the rear wheel electric motor 114. Based on the computed front wheel torque command value and rear wheel torque command value, the control unit 140 provides a front wheel torque command to the front wheel motor drive unit 143 and provides a rear wheel torque command to the rear wheel motor drive unit 144.

The control unit 140 includes a microcomputer and is programmed to realize a plurality of functions, including functions as the front wheel torque command value computing unit 141 and the rear wheel torque command value computing unit 142. More specifically, the control unit 140 includes a processor (CPU) and a storage medium (memory) storing a program executed by the processor.

The front wheel motor drive unit 143 includes a motor drive circuit that supplies driving electric power to the front wheel electric motor 113. The rear wheel motor drive unit 144 includes a motor drive circuit that supplies driving electric power to the rear wheel electric motor 114. The front wheel motor drive unit 143 supplies, to the front wheel electric motor 113, electric power corresponding to the front wheel torque command provided from the control unit 140. The rear wheel motor drive unit 144 supplies, to the rear wheel electric motor 114, electric power corresponding to the rear wheel torque command provided from the control unit 140.

Although not illustrated in FIG. 2, the battery 112 is connected to the front wheel motor drive unit 143 and the rear wheel motor drive unit 144 (see FIG. 1).

Figure 3:
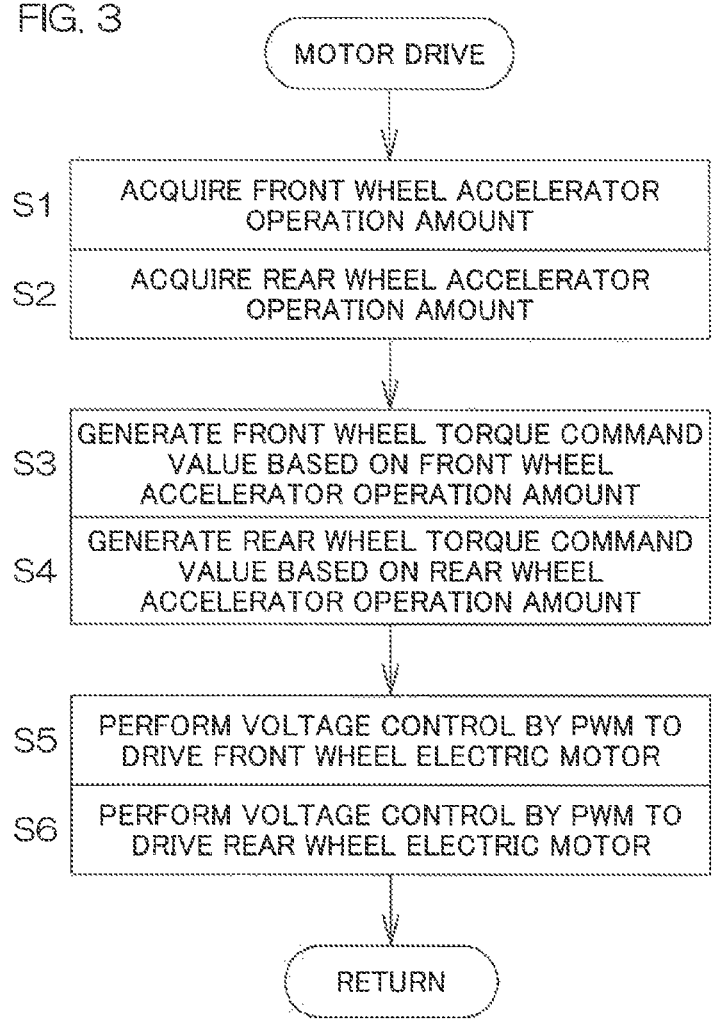
FIG. 3 is a flowchart for describing a control operation by a control unit included in the electric two-wheeled vehicle.

FIG. 3 is a flowchart for describing a control operation by the control unit 140 and shows processing repeated by the control unit 140 at a predetermined control cycle.

The control unit 140 acquires the accelerator grip operation amount (front wheel accelerator operation amount) detected by the front wheel accelerator sensor 153 (step S1) and generates the front wheel torque command value corresponding to the acquired front wheel accelerator operation amount (step S3). The control unit 140 generates the front wheel torque command value such that the greater the front wheel accelerator operation amount, the greater the driving torque generated from the front wheel electric motor 113. The front wheel electric motor 113 is driven by the front wheel motor drive unit 143 based on the front wheel torque command value (step S5). Voltage supplied to the front wheel electric motor 113 is controlled, for example, by PWM (pulse width modulation) control.

Also, the control unit 140 acquires the accelerator pedal operation amount (rear wheel accelerator operation amount) detected by the rear wheel accelerator sensor 154 (step S2) and generates the rear wheel torque command value corresponding to the acquired rear wheel accelerator operation amount (step S4). The control unit 140 generates the rear wheel torque command value such that the greater the rear wheel accelerator operation amount, the greater the driving torque generated from the rear wheel electric motor 114. The rear wheel electric motor 114 is driven by the rear wheel motor drive unit 144 based on the rear wheel torque command value (step S). Voltage supplied to the rear wheel electric motor 114 is controlled, for example, by PWM control.

Figure 4:
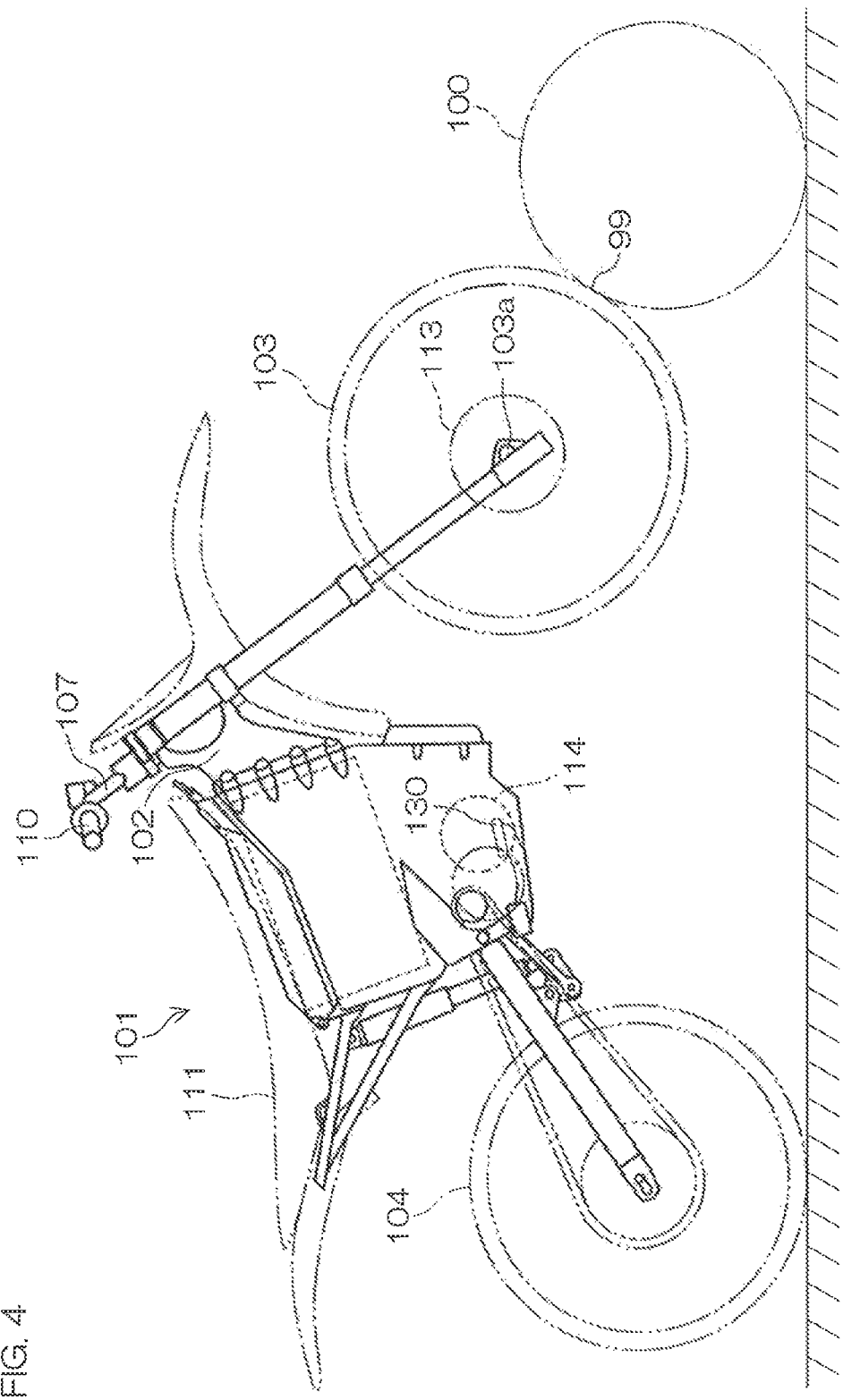
FIG. 4 is a diagram for describing a manner in which the electric two-wheeled vehicle rides over an obstacle.

FIG. 4 is a diagram for describing a manner in which the electric two-wheeled vehicle 101 rides over an obstacle 100. When there is an obstacle 100 such as a log on a traveling road of the electric two-wheeled vehicle 101, there is a case where it is difficult to ride over the obstacle 100 even if a front portion of the front wheel 103 that is kept in contact with the ground surface is put in contact with the obstacle 100. Specifically, such a case is where a position of contact of the front wheel 103 with the obstacle 100 is at a height approximately equal to or higher than an axle 103a of the front wheel 103. Thus as shown in FIG. 4, the front wheel 103 is lifted to realize a state where the height of the axle 103a of the front wheel 103 is sufficiently high in comparison to a contact position 99 of the front wheel 103 and the obstacle 100. When in this state, the front wheel electric motor 113 is driven, the front wheel 103 generates a force that pulls the electric two-wheeled vehicle 101 onto the obstacle 100. The electric two-wheeled vehicle 101 can thereby be made to ride over the obstacle 100 and advance.

When the user (driver) attempts to lift the front wheel 103, if a large driving torque is acting on the front wheel 103, the front wheel 103 will tend to propel forward rather upward. The user will thereby be made to feel as if the front wheel 103 is sucked toward the ground surface. The operation of lifting the front wheel 103 is thus difficult and the front wheel 103 cannot be made to ride on the obstacle 100 easily.

The present inventor found that the above issue can be resolved by making a driving force of the front wheel 103 be generated with delay after the driving force of the rear wheel 104. That is, the user keeps the accelerator grip 110 in a non-operated state and lifts the handlebar 107 while stepping on the accelerator pedal 130 to generate the driving force of the rear wheel 104. The front wheel 103 can thereby be lifted easily. By the driving force being imparted to the rear wheel 104 in the state where the front wheel 103 is lifted, the electric two-wheeled vehicle 101 moves forward toward the obstacle 100 and the front wheel 103 can be made to ride on the obstacle 100.

After the front wheel 103 is raised (may be before or after the front wheel 103 contacts the obstacle 100), the user operates the accelerator grip 110 to make the driving force of the front wheel electric motor 113 be generated. The front wheel 103 is thereby driven and the vehicle body is pulled forward by the driving force of the front wheel 103. The vehicle body is thereby pulled up onto the obstacle 100 and further, by the rear wheel 104 passing over the obstacle 100, the electric two-wheeled vehicle 101 can ride over the obstacle 100 and move forward.

Figure 5:
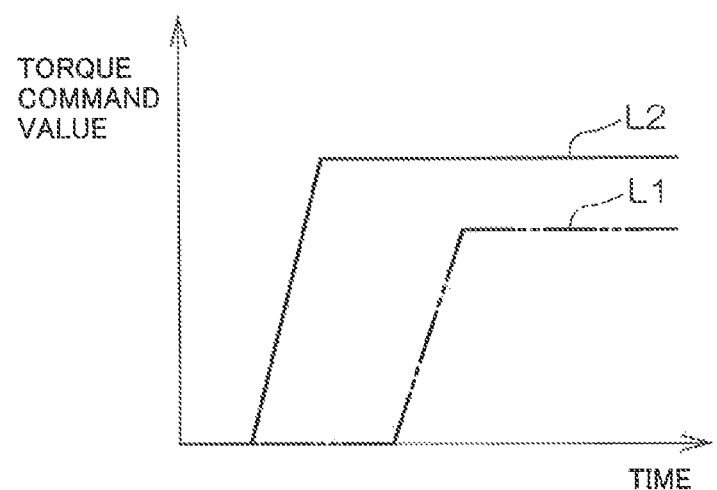
FIG. 5 is a diagram of an example of changes with time of a front wheel torque command value and a rear wheel torque command value when riding over an obstacle.

FIG. 5 is a diagram of an example of changes with time of the front wheel torque command value and the rear wheel torque command value when riding over an obstacle as described above. In a state where the front wheel torque command value, indicated by a line L1, is zero, the rear wheel torque command value, indicated by a line L2, rises from zero. A torque can thereby be imparted to the rear wheel 104 by the rear wheel electric motor 114 with the front wheel 103 being in a freely rotating state and therefore a state is entered where the front wheel 103 rises easily. By the user pulling up the handlebar 107 correspondingly, the front wheel 103 can be made to rise. Thereafter, in response to the user operating the accelerator grip 110, the front wheel torque command value rises with delay after the rear wheel torque command value.

By thus operating the accelerator grip 110 and the accelerator pedal 130 so that the torque of the front wheel electric motor 113 is generated and increases with delay after the torque of the rear wheel electric motor 114, the electric two-wheeled vehicle 101 can ride over the obstacle 100 easily.

The front wheel torque command value when the front wheel 103 is lifted is not required to be zero. That is, the operation of lifting the front wheel 103 is comparatively easy if the front wheel torque command value is sufficiently small and the rear wheel torque command value is sufficiently large.

Second Embodiment

Figure 6:
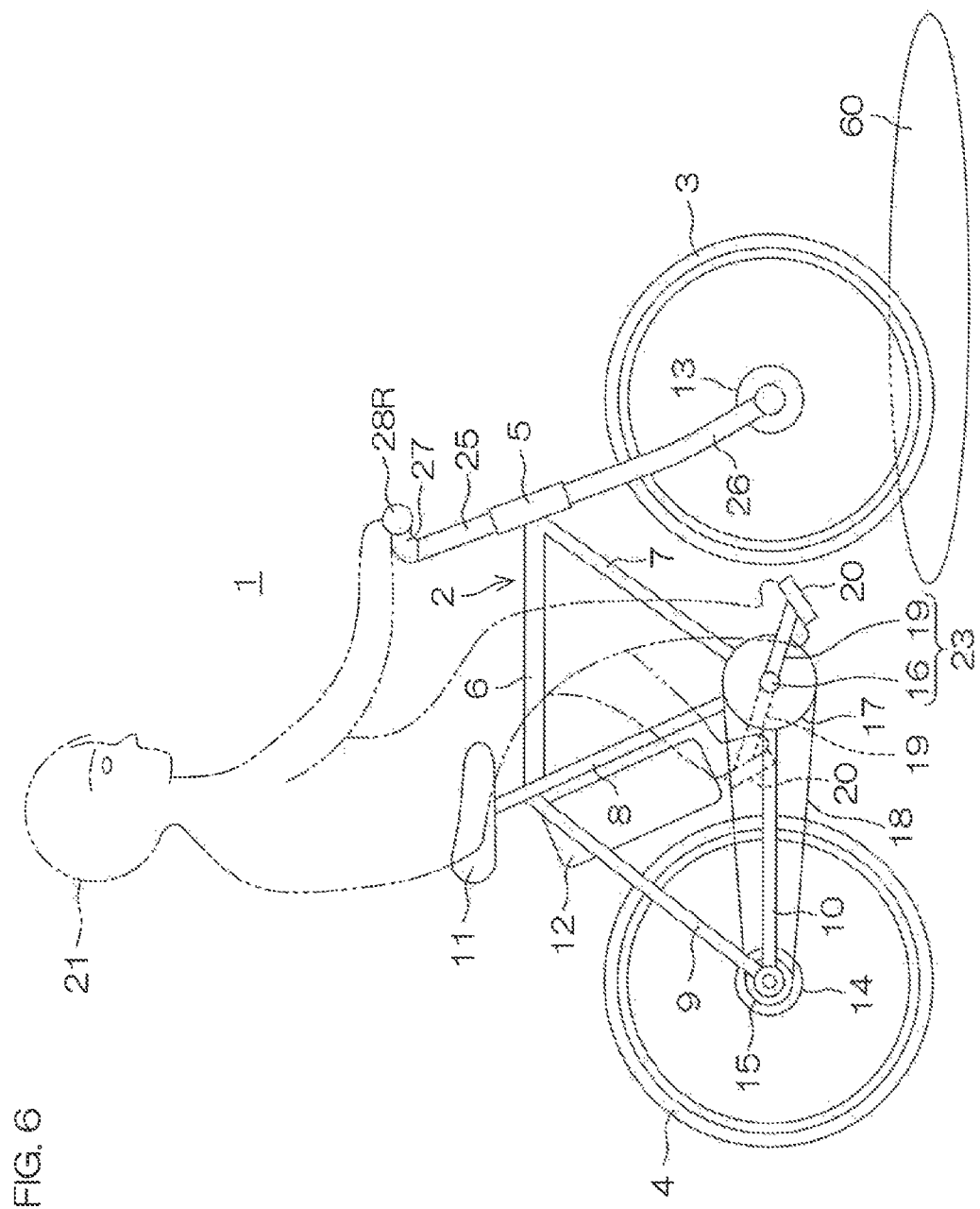
FIG. 6 is a side view for describing the arrangement of an electric two-wheeled vehicle according to a second embodiment of the present invention.

FIG. 6 is a side view for describing the arrangement of vehicle according to a second embodiment of the present invention. In the description that follows, front, rear, right, and left directions shall refer to directions as viewed by a user sitting on a saddle. That is, a right side surface of the electric two-wheeled vehicle 1 is shown in FIG. 6.

The present vehicle is an electric vehicle that includes an arrangement that transmits a driving force of an electric motor to a vehicle wheel and is more specifically an electric two-wheeled vehicle 1 that includes a front wheel 3 and a rear wheel 4. Further, the present electric two-wheeled vehicle 1 includes a human powered drive system arranged to drive the rear wheel 4 by means of a human force.

The electric two-wheeled vehicle 1 includes vehicle body frame 2, constituting a straddled vehicle body, a front wheel 3 mounted to the vehicle body frame 2, and a rear wheel 4 similarly mounted to the vehicle body frame 2. In the present embodiment, the front wheel 3 and the rear wheel 4 are mutually equal in outer diameter. The vehicle body frame 2 includes a head pipe 5, an upper pipe 6, a front pipe 7, a seat pipe 8, a pair of right and left rear pipes 9, and a pair of right and left lower pipes 10. The upper pipe 6 is provided so as to extend rearward from the head pipe 5. The front pipe 7 is disposed below the upper pipe 6 and extends rearward and obliquely downward from the head pipe 5. The seat pipe 8 is provided so as to extend upward from a rear end portion of the front pipe 7. A rear end portion of the upper pipe 6 is coupled to the seat pipe 8. A saddle 11 is mounted to an upper end portion of the seat pipe 8. A battery 12 is mounted to the seat pipe 8 below the saddle 11.

The pair of rear pipes 9 are provided substantially parallel to each other so as to extend rearward and obliquely downward from the rear end portion of the upper pipe 6. On the other hand, the pair of lower pipes 10 are provided substantially parallel to each other so as to extend rearward and substantially horizontally from the rear end portion of the front pipe 7. Rear end portions of the pair of rear pipes 9 and the rear end portions of the pair of lower pipes 10 are connected respectively to each other. A rear wheel sprocket 15 and the rear wheel 4 are rotatably mounted to the coupling portion of the rear pipes 9 and the lower pipes 10. A rear wheel electric motor 14 is incorporated in a hub of the rear wheel 4. The rear wheel electric motor 14 is arranged to impart a driving force to the rear wheel 4.

A crankshaft 16 is rotatably mounted, so as to extend horizontally to the right and left, to the coupling portion of the front pipe 7 and the seat pipe 8. A drive sprocket 17 is mounted to the crankshaft 16. An endless chain 18 is wound around the drive sprocket 17 and the rear wheel sprocket 15. Rotation of the crankshaft 16 is thus transmitted from the drive sprocket 17 to the rear wheel sprocket 15 via the chain 18. A pair of crank arms 19 are respectively mounted to respective end portions of the crankshaft 16. The crankshaft 16 and the pair of crank arms 19 constitute a crank 23. A pair of pedals 20 are respectively mounted to the pair of crank arms 19. The crankshaft 16 can be rotated by a rider 21 operating the pedals 20, and the rear wheel 4 can thereby be driven by a human force.

A steering shaft 25 is rotatably inserted in the head pipe 5. A pair of front forks 25 are mounted, substantially parallel to each other, to a lower end portion of the steering shaft 25. The front wheel 3 is rotatably mounted to lower end portions of the pair of front forks 26. A front wheel electric motor 13 is incorporated in a hub of the front wheel 3. The front wheel electric motor 13 is arranged to impart a driving force to the front wheel 3. A handlebar 27 is mounted to an upper end of the steering shaft 25.

The handlebar 27 extends substantially horizontally and has a pair of grips 28L and 28R (see also FIG. 7) that are respectively gripped by the right hand and the left hand of the rider 21. By the rider 21 pivotally operating the handlebar 27 to the right and left, the steering shaft 25 is pivoted around an axial center of the head pipe 5 as a center and accordingly, the front forks 26 and the front wheel 3 are pivoted integrally to the right and left. The electric two-wheeled vehicle 1 is thereby steered.

The grip 28R at the right side as viewed from the rider 21 is provided to be rotatable around an axis of the handlebar 27 and is an accelerator grip arranged to adjust outputs of the rear wheel electric motor 14 and the front wheel electric motor 13.

The present electric two-wheeled vehicle 1 includes a traction control function that detects a slipping state of the front wheel 3 or the rear wheel 4 and promptly recovers a gripping force. For example, in a case where states of road surfaces respectively contacted by the front wheel 3 and the rear wheel 4 differ as when the front wheel 3 comes across a manhole cover 60, etc., slipping of the vehicle wheel on the road surface of low friction coefficient occurs readily.

Figure 7:
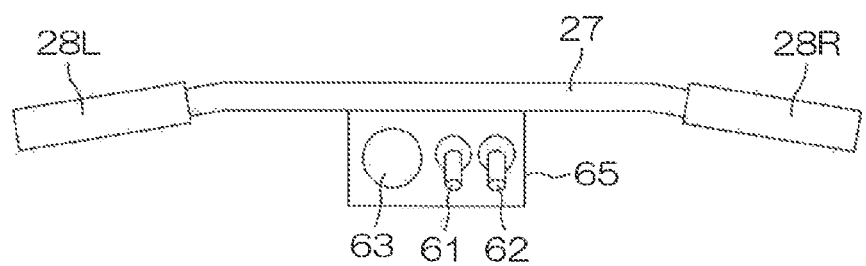
FIG. 7 is a plan view of an arrangement example of a remote control unit included in the electric two-wheeled vehicle.

FIG. 7 is a plan view of an arrangement example of a remote control unit 65 included in the handlebar 27. The remote control unit 65 includes a first switch 61, a second switch 62, and an adjusting volume knob 63 that are operated by the user. The first switch 61 and the second switch 62 are switches for switching a control mode.

The first switch 61 is, for example, a switch arranged to turn on/off the traction control. When the traction control is activated, for example, the traction control of the front wheel 3 and the rear wheel 4 or the traction control of just the rear wheel 4 is performed in correspondence to the control mode. That is, when slipping of the front wheel 3 and/or the rear wheel 4 is detected, a driving force control of decreasing the driving force of the vehicle wheel that has slipped to recover the grip of that vehicle wheel is performed.

The second switch 62 is a switch arranged to turn on/off coordinated control of the front and rear wheels 3 and 4. When the coordinated control is activated, the front wheel driving force and the rear wheel driving force are controlled in correspondence to an operation input of either an operation amount of the accelerator grip 28R or a stepping force (pedal effort) applied to the pedals 20. When the coordinated control is inactivated, the driving forces of the front wheel 3 and the rear wheel 4 are controlled independently. More specifically, when the coordinated control is inactive, the front wheel electric motor 13 generates a torque in correspondence to the operation amount of the accelerator grip 28R and the rear wheel electric motor 14 generates a torque in correspondence to the pedal stepping force.

The second switch 62 that turns on/off the coordinated control is an example of a mode switching unit.

By combination of the on/off of traction control and the on/off of the coordinated control, selection can be made among the four control modes of Modes 1 to 4 indicated below.

Mode 1: Traction control on, coordinated control on
Mode 2: Traction control on, coordinated control off
Mode 3: Traction control off, coordinated control on
Mode 4: Traction control off, coordinated control off Among the above, each of Mode 1 and Mode 3, in which the coordinated control is activated, is an example of a common control mode. Also, each of Mode 2 and Mode 4, in which the coordinated control is inactivated, is an example of an individual control mode.

The adjusting volume knob 63 is an adjusting operation unit arranged to adjust a proportion of an assist force with respect to the pedal stepping force. When the coordinated control is off, the proportion of the rear wheel driving force with respect to the pedal stepping force will be in accordance with a setting of the adjusting volume knob 63. If when the coordinated control is on, the pedal stepping force is used as an operation input, the proportion of the total driving force of the front and rear wheels with respect to the pedal stepping force will be in accordance in with the setting of the adjusting volume knob 63.

Figure 8:
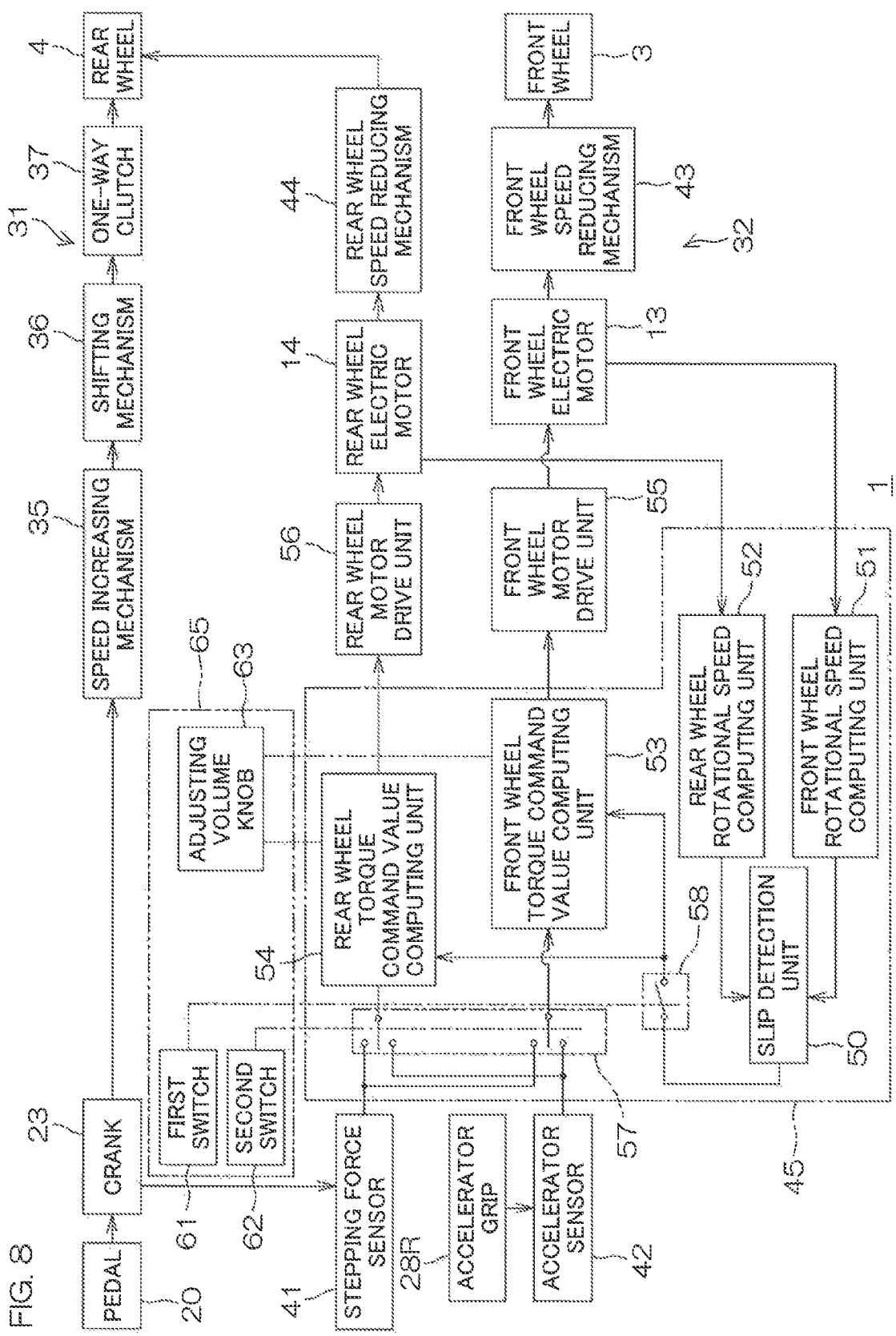
FIG. 8 is a block diagram for describing the arrangement of a control system of the electric two-wheeled vehicle.

FIG. 8 is a block diagram for describing the arrangement of a control system of the electric two-wheeled vehicle 1. The electric two-wheeled vehicle 1 has a human powered drive system 31, with which the stepping force applied by the rider 21 (user) to the pedals 20 is shifted at a predetermined shift ratio and supplied to the rear wheel 4, and an electric drive system 32, with which the driving forces of the rear wheel electric motor 14 and the front wheel electric motor 13 are supplied respectively to the rear wheel 4 and the front wheel 3. The human powered drive system 31 is an example of a human powered drive mechanism.

The human powered drive system 31 includes the crank 23, which is rotated by the stepping force applied to the pedals 20, a speed increasing mechanism 35, a shifting mechanism 36, and a one-way clutch 37. The speed increasing mechanism 35 includes the drive sprocket 17, the chain 18, and the rear wheel sprocket 15. The rotation of the crank 23 is increased in speed in correspondence to a gear ratio of the drive sprocket 17 and the rear wheel sprocket 15. The shifting mechanism 36 is, for example, housed inside the rear wheel hub and is arranged to output the rotation of an input shaft, coupled to the rear wheel sprocket 15, to an output shaft upon shifting at any of a plurality of (for example, three) shift ratios. The one-way clutch 37 transmits a rotating force of one direction (forward direction) of the output shaft of the shifting mechanism 36 to the rear wheel 4 and does not transmit rotation of the other direction (backward direction). The forward direction rotating force (human powered torque) applied to the crank 23 is thus increased in speed by the speed increasing mechanism 35, thereafter shifted by the shifting mechanism 36, and then transmitted via the one-way clutch 37 to the rear wheel 4.

The electric drive system 32 drives the rear wheel electric motor 14 and the front wheel electric motor 13 in correspondence to an output of a stepping force sensor 41 and/or an output of an accelerator sensor 42. The electric drive system 32 also controls the front wheel electric motor 13 and the rear wheel electric motor 14 in accordance with the control mode (any of Modes 1 to 4 mentioned above) set by the first and second switches 61 and 62. The electric drive system 32 also controls the front wheel electric motor 13 and the rear wheel electric motor 14 so that an assist force of a proportion corresponding to an operation amount of the adjusting volume knob 63 is generated.

The stepping force sensor 41 detects the stepping force (torque) applied to the crank 23 and outputs a stepping force signal corresponding to the stepping force. The accelerator sensor 42 detects the operation amount of the accelerator grip 28R and outputs an accelerator signal corresponding to the operation amount. The pedals 20 and the accelerator grip 28R are examples of driving torque operating members operated by an operator to set driving torques to be generated by the electric motors 13 and 14. Also, each of the stepping force sensor 41 and the accelerator sensor 42 is an example of an operation amount sensor arranged to detect the operation amount (operation force or displacement amount) of the corresponding drive torque operating member.

The electric drive system 32 includes the remote control unit 65, the stepping force sensor 41, the accelerator sensor 42, the front wheel electric motor 13, the rear wheel electric motor 14, a front wheel speed reducing mechanism 43, a rear wheel speed reducing mechanism 44, and a control unit 45. The control unit 45 drives the front wheel electric motor 13 and the rear wheel electric motor 14 in correspondence to the outputs of the remote control unit 65, the stepping force sensor 41, and/or the accelerator sensor 42. The rotation of the front wheel electric motor 13 is transmitted to the front wheel 3 upon being reduced in speed by the front wheel speed reducing mechanism 43. The rotation of the rear wheel electric motor 14 is transmitted to the rear wheel 4 upon being reduced in speed by the rear wheel speed reducing mechanism 44.

In certain control modes of the control unit 45, the pedals 20 and the stepping force sensor 41 function as a rear wheel input unit that inputs an operation input used to compute a torque command value of the rear wheel electric motor 14. Also, in other control modes, the pedals 20 and the stepping force sensor 41 function as an input unit that inputs an operation input used in common to compute respective torque command values of the front wheel electric motor 13 and the rear wheel electric motor 14.

Also, in certain control modes of the control unit 45, the accelerator grip 28R and the accelerator sensor 42 function as a front wheel input unit that inputs an operation input used to compute the torque command value of the front wheel electric motor 13. Also, in other control modes, the accelerator grip 28R and the accelerator sensor 42 function as an input unit that inputs an operation input used in common to compute the respective torque command values of the front wheel electric motor 13 and the rear wheel electric motor 14.

The control unit 45 includes a front wheel torque command value computing unit 53 and a rear wheel torque command value computing unit 54. The front wheel torque command value computing unit 53 and the rear wheel torque command value computing unit 54 respectively compute the front wheel torque command value and the rear wheel torque command value corresponding to the outputs of the remote control unit 65, the stepping force sensor 41, and/or the accelerator sensor 42.

The control unit 45 provides a front wheel torque command (front wheel drive command), corresponding to the front wheel torque command value, to a front wheel motor drive unit 55. Also, the control unit 45 provides a rear wheel torque command (rear wheel drive command), corresponding to the rear wheel torque command value, to a rear wheel motor drive unit 56. The front wheel motor drive unit 55 includes a drive circuit that drives the front wheel electric motor 13 based on the front wheel torque command. The rear wheel motor drive unit 56 includes a drive circuit that drives the rear wheel electric motor 14 based on the rear wheel torque command.

The front wheel torque command value is a command value of the driving torque to be generated by the front wheel electric motor 13. The rear wheel torque command value is a command value of the driving torque to be generated by the rear wheel electric motor 14. The front wheel motor drive unit 55 and the rear wheel motor drive unit 56 perform PWM (pulse width modulation) control of a driving voltage from the battery 12 (see FIG. 6) at duty ratios respectively corresponding to the front wheel torque command value and the rear wheel torque command value. The PWM controlled driving voltages are applied to the front wheel electric motor 13 and the rear wheel electric motor 14. Driving currents, respectively corresponding to the front wheel torque command value and the rear wheel torque command value are thereby made to flow through the front wheel electric motor 13 and the rear wheel electric motor 14.

The control unit 45 further includes a slip detection unit 50 that detects the slipping state of the front wheel 3 and the slipping state of the rear wheel 4. The control unit 45 also includes a front wheel rotational speed computing unit 51 that computes a front wheel rotational speed from a rotational speed of the front wheel electric motor 13, and a rear wheel rotational speed computing unit 52 that computes a rear wheel rotational speed from a rotational speed of the rear wheel electric motor 14. The slip detection unit 50 detects the slipping state of the front wheel 3 and the slipping state of the rear wheel 4 based on the front wheel rotational speed and the rear wheel rotational speed computed respectively by the front wheel rotational speed computing unit 51 and the rear wheel rotational speed computing unit 52. If speed reduction ratios of the front wheel and rear wheel speed reducing mechanisms 43 and 44 are equal to each other, the front wheel and rear wheel rotational speed computing unit 51 and 52 may output the rotational speeds of the front wheel and rear wheel electric motors 13 and 14 as information respectively expressing the front wheel rotational speed and the rear wheel rotational speed.

The output signal of the stepping force sensor 41 may be provided via a sensor switching unit 57 to the front wheel torque command value computing unit 53 and the rear wheel torque command value computing unit 54. Similarly, the output signal of accelerator sensor 42 may be provided via the sensor switching unit 57 to the front wheel torque command value computing unit 53 and the rear wheel torque command value computing unit 54.

The sensor switching unit 57 may, for example, take on the following states.

State 1: The output signal of the stepping force sensor 41 is provided to both the front wheel torque command value computing unit 53 and the rear wheel torque command value computing unit 54 and the output signal of the accelerator sensor 42 is not provided to either of the torque command value computing units 53 and 54.

State 2: The output signal of the stepping force sensor 41 is provided to the rear wheel torque command value computing unit 54 and the output signal of the accelerator sensor 42 is provided to the front wheel torque command value computing unit 53.

State 3: The output signal of the stepping force sensor 41 is not provided to either of the torque command value computing units 53 and 54 and the output signal of the accelerator sensor 42 is provided to both the front wheel torque command value computing unit 53 and the rear wheel torque command value computing unit 54.

The sensor switching unit 57 is switched by operation of the second switch 62 of the remote control unit 65. Specifically, State 1 or State 3 is entered when the coordinated control is activated by the second switch 62. Which of State 1 and State 3 is entered will be in accordance with the program executed by the control unit 45. The sensor switching unit 57 is in State 2 when the coordinated control is inactivated.

The result of detection by the slip detection unit 50 is input into the front wheel torque command value computing unit 53 and the rear wheel torque command value computing unit 54 via a traction control switching unit 58. The traction control switching unit 58 is switched between an off state and an on state. In the on state, the detection result of the slip detection unit 50 is provided to the torque command value computing units 53 and 54 and the traction control is executed based thereon. In the off state, the detection result of the slip detection unit 50 is not transmitted to the torque command value computing units 53 and 54 and the traction control is not executed.

The traction control switching unit 58 is switched by the first switch 61 of the remote control unit 65. That is, when the traction control is made effective by the first switch 61, the traction control switching unit 58 is put in an on state, and when the traction control is made ineffective by the first switch 61, the traction control switching unit 58 is put in an off state.

The control unit 45 includes a microcomputer and is programmed to realize a plurality of functions. More specifically, the control unit 140 includes a processor (CPU) and a storage medium (memory) storing a program executed by the processor. The plurality of functions include the functions as the slip detection unit 50, the front wheel rotational speed computing unit 51, the rear wheel rotational speed computing unit 52, the front wheel torque command value computing unit 53, the rear wheel torque command value computing unit 54, the sensor switching unit 57, and the traction control switching unit 58.

FIG. 9 and FIG. 10A to FIG. 10D are flowcharts for describing a processing example of the control unit 45 related to control of the front wheel electric motor 13 and the rear wheel electric motor 14 and show processing repeated by the control unit 45 at a predetermined control cycle.

The control unit 45 acquires the signals from the remote control unit 65 (step S11). Specifically, the control unit 45 acquires the states of the first switch 61 and the second switch 62 and the operation amount of the adjusting volume knob 63. In correspondence to the states of the first and second switches 61 and 62, the control unit 45 generates the torque command values for the front wheel electric motor 13 and the rear wheel electric motor 14 in accordance with a control mode among Modes 1 to 4.

That is, when the traction control is activated by the first switch 61 (step S12), if the coordinated control is activated by the second switch 62 (step S13), the control mode is set to Mode 1 (step S14). When the traction control is activated by the first switch 61 (step S12), if the coordinated control is inactivated by the second switch 62 (step S13), the control mode is set to Mode 2 (step S15). When the traction control is inactivated by the first switch 61 (step S12), if the coordinated control is activated by the second switch 62 (step S16), the control mode is set to Mode 3 (step S17). When the traction control is inactivated by the first switch 61 (step S12), if the coordinated control is inactivated by the second switch 62 (step S16), the control mode is set to Mode 4 (step S18).

In Mode 1, the control unit 45 controls the sensor switching unit 57 to be in State 1 or State 3 described above. Which of the states is entered will be in accordance with the setting of the program executed by the control unit 45. If the sensor switching unit 57 is controlled to be in State 1, the output signal of the stepping force sensor 41 is acquired as an operation input signal (step S19) and the front wheel torque command value and the rear wheel torque command value are generated based on the operation input signal. If the sensor switching unit 57 is controlled to be in State 3, the output signal of the accelerator sensor 42 is acquired as the operation input signal (step S19) and the front wheel torque command value and the rear wheel torque command value are generated based on the operation input signal.

Therefore, when the sensor switching unit 57 is controlled to be in State 1, the electric two-wheeled vehicle 1 operates as a power-assisted bicycle, with which an assist driving force is applied to the front wheel 3 and the rear wheel in correspondence to the pedal stepping force. The proportion of the assist driving force with respect to the pedal stepping force is in accordance with the setting set by the adjusting volume knob 63. When the sensor switching unit 57 is controlled to be in State 3, the electric two-wheeled vehicle 1 operates as an electric vehicle that travels just by the driving forces of the electric motors 13 and 14. In Mode 1, the traction control switching unit 58 is put in the on state.

In Mode 2, the control unit 45 controls the sensor switching unit 57 to be in State 2 described above. The output signal of the accelerator sensor 42 and the output signal of the stepping force sensor 41 are thereby acquired (step S20). The front wheel torque command value is generated based on the output signal of the accelerator sensor 42, and the rear wheel torque command value is generated based on the output signal of the stepping force sensor 41. The front wheel driving torque and the rear wheel driving torque are thus generated based on different sensor input signals. The traction control switching unit 58 is put in the on state. In this case, for example, the traction control may be performed for just the rear wheel 4.

In Mode 3, the control unit 45 controls the sensor switching unit 57 to be in State 1 or State 3 described above. Which of the states is entered will be in accordance with the setting of the program executed by the control unit 45. If the sensor switching unit 57 is controlled to be in State 1, the output signal of the stepping force sensor 41 is acquired as the operation input signal (step S21) and the front wheel torque command value and the rear wheel torque command value are generated based on the operation input signal. If the sensor switching unit 57 is controlled to be in State 3, the output signal (operation input signal) of the accelerator sensor 42 is acquired (step S21) and the front wheel torque command value and the rear wheel torque command value are generated based on the operation input signal. When the sensor switching unit 57 is put in State 1, the electric two-wheeled vehicle 1 operates as the power-assisted bicycle. The proportion of the assist driving force with respect to the pedal stepping force is in accordance with the setting set by the adjusting volume knob 63. When the sensor switching unit 57 is put in State 3, the electric two-wheeled vehicle 1 operates as the electric vehicle that travels just by the driving forces of the electric motors 13 and 14. In Mode 3, the traction control switching unit 58 is put in the off state.

In Mode 4, the control unit 45 controls the sensor switching unit 57 to be in State 2 described above. The output signal of the accelerator sensor 42 is thereby acquired as the operation input signal (step S22) and the front wheel torque command value is generated based thereon. Also, the output signal of the stepping force sensor 41 is acquired as the operation input signal (step S22) and the rear wheel torque command value is generated based thereon. The front wheel driving torque and the rear wheel driving torque are thus generated based on different sensor input signals. The traction control switching unit 58 is put in the off state. The traction control is thus not performed for either of the front wheel 3 and the rear wheel 4.

Figure 10A:
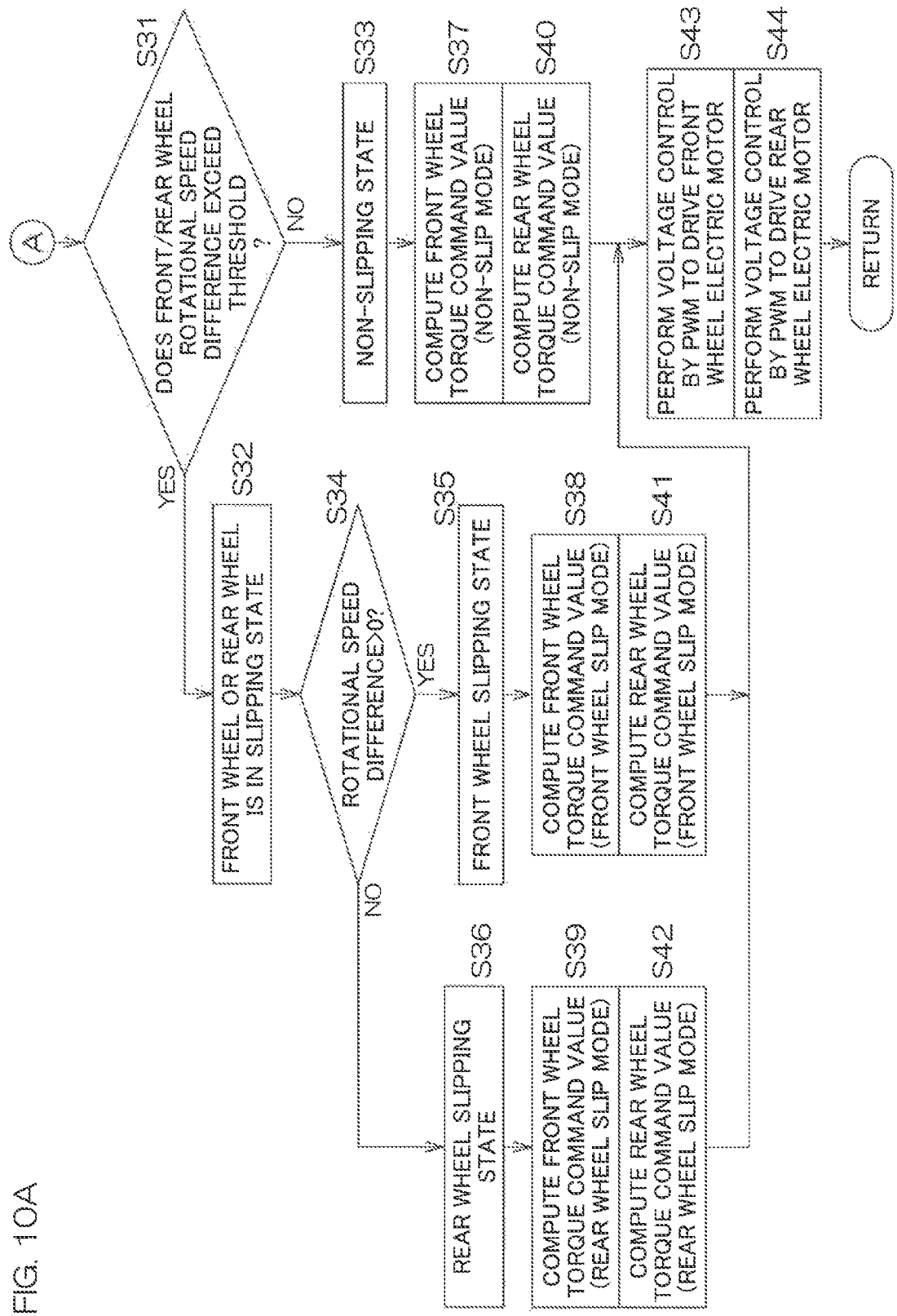
FIG. 10A is a flowchart for describing a specific operation example of a control unit in Mode 1 (traction control: on, coordinated control: on).

FIG. 10A is a flowchart for describing a specific operation example of the control unit 45 in Mode 1 (traction control: on, coordinated control: on).

When an absolute value of a front/rear wheel rotational speed difference, obtained by subtracting the rear wheel rotational speed from the front wheel rotational speed exceeds a predetermined threshold (step S31: YES), the slip detection unit 50 determines that either the front wheel 3 or the rear wheel 4 is in the slipping state (step S32). Or else (step S31: NO), the slip detection unit 50 determines that neither the front wheel 3 nor the rear wheel 4 is in the slipping state (step S33).

If it is determined that either the front wheel 3 or the rear wheel 4 is in the slipping state (step S32) and if the front/rear wheel rotational speed difference is positive (step S34: YES), the slip detection unit 50 further determines that the front wheel 3 is in the slipping state (step S35; front wheel slip detection). On the other hand, if the front/rear wheel rotational speed difference is negative (step S34: NO), the slip detection unit 50 further determines that the rear wheel 4 is in the slipping state (step S36; rear wheel slip detection). That is, when the absolute value of a front/rear wheel rotational speed difference of the front wheel 3 and the rear wheel 4 is greater than the threshold value, the slip detection unit 50 determines the wheel of higher rotational speed between the front wheel 3 and the rear wheel 4 to be in the slipping state.

If the front wheel 3 and the rear wheel 4 are in non-slipping states (step S33), the front wheel torque command value computing unit 53 performs front wheel torque command value computation according to a non-slip mode (ordinary mode) (step S37). Also, if the front wheel 3 is in the slipping state (step S35), the front wheel torque command value computing unit 53 performs the front wheel torque command value computation according to a front wheel slip mode (step S38). Also, if the rear wheel 4 is in the slipping state (step S36), the front wheel torque command value computing unit 53 performs the front wheel torque command value computation according to a rear wheel slip mode (step S39).

Similarly, if the front wheel 3 and the rear wheel 4 are in non-slipping states (step S33), the rear wheel torque command value computing unit 54 performs rear wheel torque command value computation according to the non-slip mode (ordinary mode) (step S40). Also, if the front wheel 3 is in the slipping state (step S35), the rear wheel torque command value computing unit 54 performs the rear wheel torque command value computation according to the front wheel slip mode (step S41). Also, if the rear wheel 4 is in the slipping state (step S36), the rear wheel torque command value computing unit 54 performs the rear wheel torque command value computation according to the rear wheel slip mode (step S42).

The front wheel motor drive unit 55 then performs PWM control of the driving voltage at the duty ratio corresponding to the front wheel torque command value to make the current corresponding to the front wheel torque command value flow through the front wheel electric motor 13 (step S43). Similarly, the rear wheel motor drive unit 56 performs PWM control of the driving voltage at the duty ratio corresponding to the rear wheel torque command value to make the current corresponding to the rear wheel torque command value flow through the rear wheel electric motor 14 (step S44). Thereafter, the same operations are repeated at the predetermined control cycle.

In the non-slip mode (step S33), the front wheel torque command value computing unit 53 computes a front wheel torque command value that is greater the greater the output signal (operation input signal) of the stepping force sensor 41 or the accelerator sensor 42. Specifically, a front wheel torque command value that is proportional to the stepping force or the accelerator operation amount (operation input) is computed. Similarly, in the non-slip mode (step S33), the rear wheel torque command value computing unit 54 computes a rear wheel torque command value that is greater the greater the output signal (operation input signal) of the stepping force sensor 41 or the accelerator sensor 42. Specifically, a rear wheel torque command value that is proportional to the stepping force or the accelerator operation amount (operation input) is computed. Proportionality coefficients of the front wheel torque command value and the rear wheel torque command value with respect to the operation input are in accordance with the setting set by the adjusting volume knob 63.

In the front wheel slip mode (step S38), the front wheel torque command value computing unit 53 computes, for example, a front wheel torque command value that fluctuates alternately and repeatedly in pulse form between a first value and a smaller second value. The first value may be equal to the front wheel torque command value (value corresponding to the output (operation input) of the stepping force sensor 41 or the accelerator sensor 42) in the non-slip mode or may be a value smaller than the value in the non-slip mode. The second value may be zero. In this case, the front wheel torque command value exhibits a pulse-form fluctuation that takes on a significant value (a value by which a forward driving force is imparted to the front wheel 3) intermittently. More specifically, the front wheel torque command value may be set to exhibit a fluctuation having a pulse waveform with a pulse width being set such that a length of time of taking on the first value shortens gradually, so that a time average value of the front wheel torque command value thereby decreases gradually. The second value may be a negative value (a value by which a torque in a braking direction is imparted). The front wheel torque command value computing unit 53 preferably generates a front wheel torque command value that fluctuates repeatedly and alternately between the first value and the second value so that the front wheel torque command value takes on the second value two times or more (at least two times).

On the other hand, the rear wheel torque command value computing unit 54 generates, in the front wheel slip mode (step S41), a rear wheel torque command value with a characteristic of increasing so as to compensate the decrease of the time average value of the front wheel torque command value. The rear wheel torque command value in this case is preferably set to exhibit a continuous fluctuation rather than a pulse-form fluctuation.

In the rear wheel slip mode (step S42), the rear wheel torque command value computing unit 54 computes, for example, a rear wheel torque command value that fluctuates alternately and repeatedly in pulse form between a third value and a smaller fourth value. The third value may be equal to the rear wheel torque command value (value corresponding to the output (operation input) of the stepping force sensor 41 or the accelerator sensor 42) in the non-slip mode or may be a value smaller than the value in the non-slip mode. The fourth value may be zero. In this case, the rear wheel torque command value exhibits a pulse-form fluctuation that takes on a significant value (a value by which a forward driving force is imparted to the rear wheel 4) intermittently. More specifically, the rear wheel torque command value may be set to exhibit a fluctuation having a pulse waveform with a pulse width being set such that a length of time of taking on the third value shortens gradually, so that a time average value of the rear wheel torque command value thereby decreases gradually. The fourth value may be a negative value (a value by which a torque in a braking direction is imparted). The rear wheel torque command value computing unit 54 preferably generates a rear wheel torque command value that fluctuates repeatedly and alternately between the third value and the fourth value so that the rear wheel torque command value takes on the fourth value two times or more (at least two times).

On the other hand, the front wheel torque command value computing unit 53 generates, in the rear wheel slip mode (step S39), a front wheel torque command value with a characteristic of increasing so as to compensate the decrease of the time average value of the rear wheel torque command value. The front wheel torque command value in this case is preferably set to exhibit a continuous fluctuation rather than a pulse-form fluctuation.

Thus in Mode 1, the output signal of one of either of the stepping force sensor 41 and the accelerator sensor 42 is used in common as the operation input signal to compute the rear wheel torque command value and the front wheel torque command value. When slipping of the front wheel 3 or the rear wheel 4 occurs, the traction control for recovering the grip of the vehicle wheel that slipped is performed.

Figure 10B:
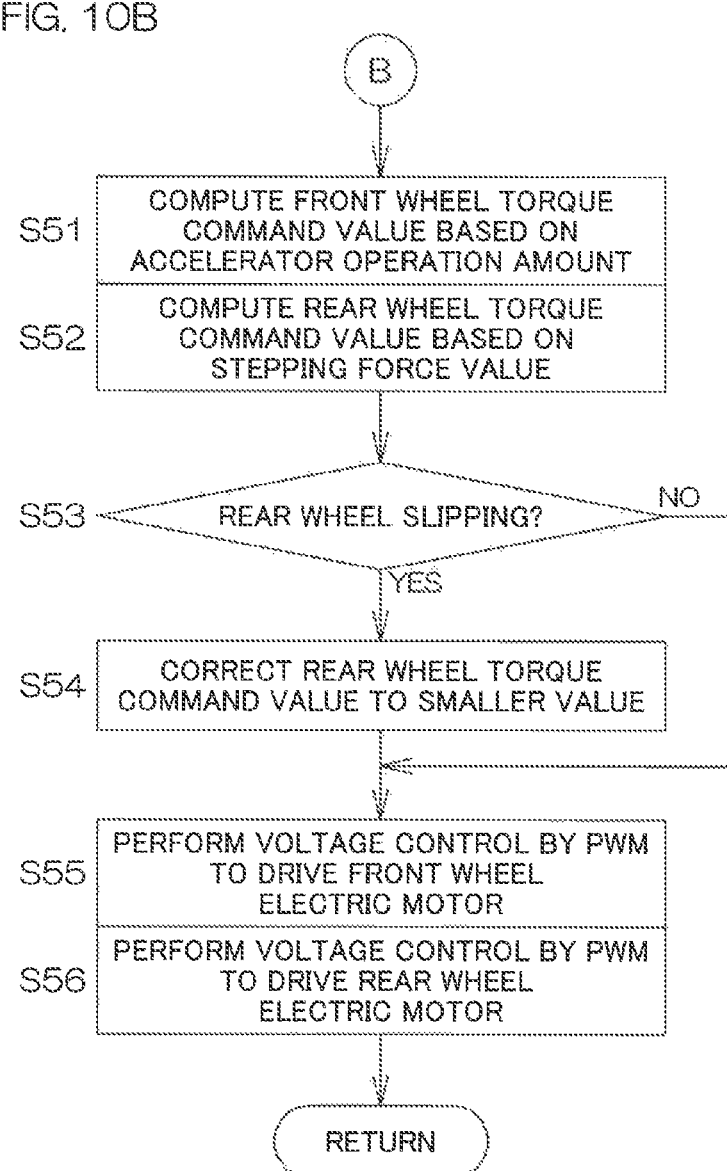
FIG. 10B is a flowchart for describing a specific operation example of the control unit in Mode 2 (traction control: on, coordinated control: off).

FIG. 10B is a flowchart for describing a specific operation example of the control unit 45 in Mode 2 (traction control: on, coordinated control: off). In Mode 2, the sensor switching unit 57 is controlled to be in State 2 (step S20 of FIG. 9). Correspondingly, the control unit 45 acquires the output signal of the accelerator sensor 42, that is, the accelerator operation amount (step S20 of FIG. 9). Also, the control unit 45 acquires the output signal of the stepping force sensor 41, that is, the stepping force value (step S20 of FIG. 9).

In Mode 2, the coordinated control is inactive and the traction control is not performed for the front wheel 3. Therefore, the front wheel torque command value computing unit 53 determines the front wheel torque command value solely based on the output signal (accelerator operation amount) of the accelerator sensor 42 (step S51).

The rear wheel torque command value computing unit 54 generates an ordinary rear wheel torque command value corresponding to the stepping force value detected by the stepping force sensor 41 (step S52). The proportion of the ordinary rear wheel torque command value with respect to the stepping force can be set the adjusting volume knob 63.

On the other hand, the slip detection unit 50 judges whether or not the rear wheel 4 is in the slipping state based on the rear wheel rotational speed determined by the rear wheel rotational speed computing unit 52 (step S53). For example, the slip detection unit 50 may determine that the rear wheel 4 is in the slipping state when a rotational acceleration of the rear wheel 4 exceeds a predetermined threshold. The rotational acceleration may be determined by time differentiating the rear wheel rotational speed.

If it is determined that the rear wheel 4 is not in the slipping state (step S53: NO), the ordinary rear wheel torque command value is used as it is as the rear wheel torque command value. On the other hand, if it is determined that the rear wheel 4 is in the slipping state (step S53: YES), the rear wheel torque command value computing unit 54 corrects the ordinary rear wheel torque command value and generates a smaller rear wheel torque command value (step S54).

The front wheel motor drive unit 55 performs PWM control of the driving voltage at the duty ratio corresponding to the front wheel torque command value to make the current corresponding to the front wheel torque command value flow through the front wheel electric motor 13 (step S55). Similarly, the rear wheel motor drive unit 56 performs PWM control of the driving voltage at the duty ratio corresponding to the rear wheel torque command value to make the current corresponding to the rear wheel torque command value flow through the rear wheel electric motor 14 (step S56).

The front wheel electric motor 13 thus generates a torque corresponding to the accelerator operation amount. Also, the rear wheel electric motor 14 generates a torque corresponding to the pedal stepping force. If the rear wheel 4 is not in the slipping state, the rear wheel electric motor 14 generates a torque corresponding to the ordinary rear wheel torque command value. On the other hand, if the rear wheel 4 is in the slipping state, the rear wheel electric motor 14 generates a torque smaller than that during the non-slipping state to recover the grip of the rear wheel 4.

When the slipping state of the rear wheel 4 is detected, the rear wheel torque command value may be set to zero or a minute fixed value instead of decreasingly correcting the ordinary rear wheel torque command value. The slipping state of the rear wheel 4 can thereby be resolved more reliably.

Figure 10C:
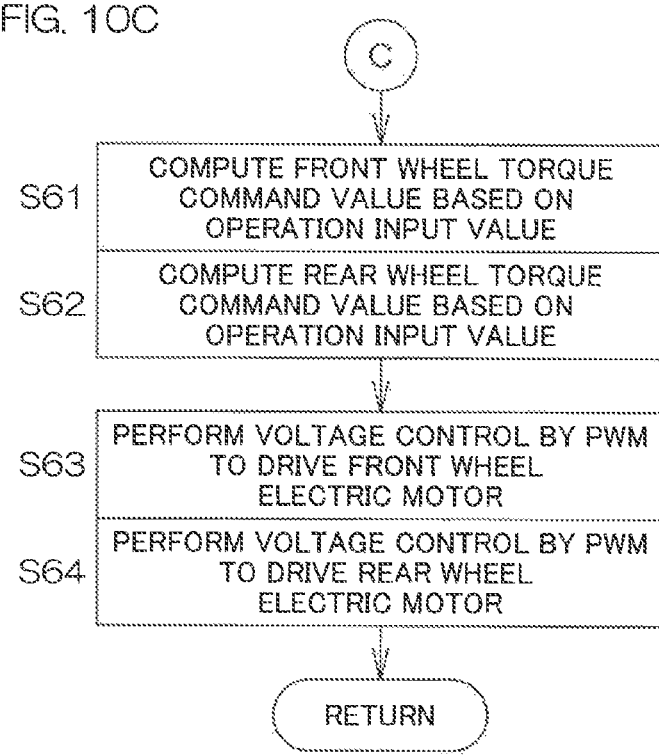
FIG. 10C is a flowchart for describing a specific operation example of the control unit in Mode 3 (traction control: off, coordinated control: on).

FIG. 10C is a flowchart for describing a specific operation example of the control unit 45 in Mode 3 (traction control: off, coordinated control: on). In Mode 3, the sensor switching unit 57 is set to State 1 or State 3. In the case of State 1, the control unit 45 acquires the output of the stepping force sensor 41 as the operation input, and in the case of State 3, the control unit 45 acquires the output of the accelerator sensor 42 as the operation input (step S21 of FIG. 9).

In Mode 3, the front wheel torque command value computing unit 53 determines the front wheel torque command value based on the acquired operation input (step S61). Also, the rear wheel torque command value computing unit 54 determines the rear wheel torque command value based on the acquired operation input (step S62).

The front wheel motor drive unit 55 performs PWM control of the driving voltage at the duty ratio corresponding to the front wheel torque command value to make the current corresponding to the front wheel torque command value flow through the front wheel electric motor 13 (step S63). Similarly, the rear wheel motor drive unit 56 performs PWM control of the driving voltage at the duty ratio corresponding to the rear wheel torque command value to make the current corresponding to the rear wheel torque command value flow through the rear wheel electric motor 14 (step S64).

If the sensor switching unit 57 is in State 1, the front wheel torque command value and the rear wheel torque command value are both computed based on the output of the stepping force sensor 41. Specifically, the front wheel torque command value and the rear wheel torque command value that are proportional to the stepping force are computed based on a front wheel assist ratio and a rear wheel assist ratio set by the adjusting volume knob 63. Assist torques corresponding to the stepping force are thereby imparted respectively to the front wheel 3 and the rear wheel 4 and assist forces corresponding to the human force applied to the pedals 20 are generated from the front wheel 3 and the rear wheel 4.

If the sensor switching unit 57 is in State 2, the front wheel torque command value and the rear wheel torque command value are both computed based on the output of the accelerator sensor 42. Specifically, the front wheel torque command value and the rear wheel torque command value that are proportional to the operation amount of the accelerator grip 28R are computed. Driving torques corresponding to the operation amount of the accelerator grip 28R are thereby applied to the front wheel 3 and the rear wheel 4.

The traction control is inactive and therefore the traction control is not performed even when the front wheel 3 or the rear wheel 4 slips. That is, resolution of the slipping state is left up solely to the user's pedal operation or accelerator operation.

Figure 10D:
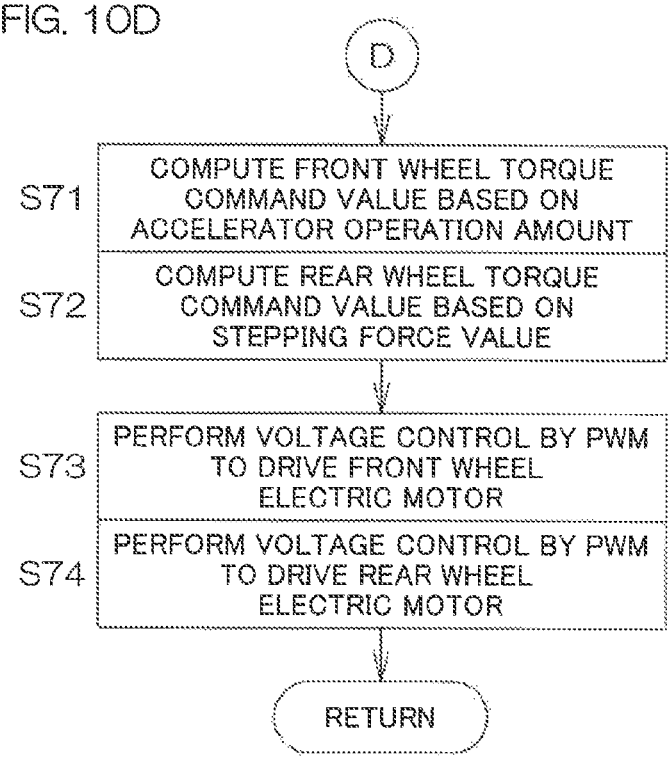
FIG. 10D is a flowchart for describing a specific operation example of the control unit in Mode 4 (traction control: off, coordinated control: off).

FIG. 10D is a flowchart for describing a specific operation example of the control unit 45 in Mode 4 (traction control: off, coordinated control: off). In Mode 4 the sensor switching unit 57 is controlled to be in State 2 (step S22 of FIG. 9). Correspondingly, the control unit 45 acquires the output signal of the accelerator sensor 42, that is, the accelerator operation amount (step S22 of FIG. 9). Also, the control unit 45 acquires the output signal of the stepping force sensor 41, that is, the stepping force value (step S22 of FIG. 9).

In Mode 4, the coordinated control is inactive and the traction control is also not performed. Therefore, the front wheel torque command value computing unit 53 determines the front wheel torque command value solely based on the output signal (accelerator operation amount) of the accelerator sensor 42 (step S71). Also, the rear wheel torque command value computing unit 54 generates the rear wheel torque command value corresponding to the stepping force value detected by the stepping force sensor 41 (step S72). The proportion of the rear wheel torque command value with respect to the stepping force is in accordance with the setting set by the adjusting volume knob 63.

The front wheel motor drive unit 55 performs PWM control of the driving voltage at the duty ratio corresponding to the front wheel torque command value to make the current corresponding to the front wheel torque command value flow through the front wheel electric motor 13 (step S73). Similarly, the rear wheel motor drive unit 56 performs PWM control of the driving voltage at the duty ratio corresponding to the rear wheel torque command value to make the current corresponding to the rear wheel torque command value flow through the rear wheel electric motor 14 (step S74).

The front wheel torque command value is thus computed based on the output of the accelerator sensor 42. Specifically, the front wheel torque command value that is proportional to the operation amount of the accelerator sensor is computed. A driving torque corresponding to the operation amount of the accelerator sensor 42 is thereby applied to the front wheel 3.

On the other hand, the rear wheel torque command value is computed based on the output of the stepping force sensor 41. Specifically, the rear wheel torque command value that is proportional to the stepping force is computed based on the rear wheel assist ratio set by the adjusting volume knob 63. An assist torque corresponding to the stepping force is thereby imparted to the rear wheel 4 and an assist force corresponding to the human force applied to the pedals 20 is generated from the rear wheel 4.

Thus in Mode 4, the front wheel torque command value corresponds to the accelerator operation amount and the rear wheel torque command value corresponds to the stepping force applied to the pedals. The driving and generated torques of the front wheel electric motor 13 and the rear wheel electric motor 14 can thereby be controlled individually in correspondence to the user's operations.

Figure 11:
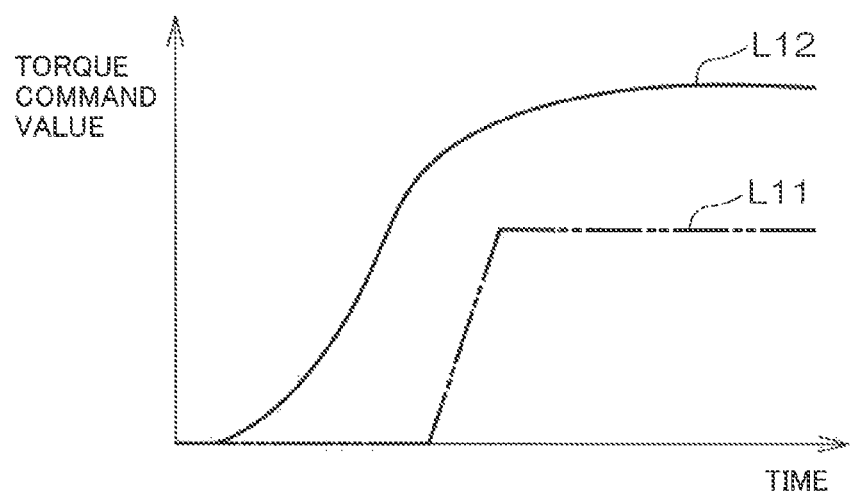
FIG. 11 is a diagram of an example of changes with time of the front wheel torque command value and the rear wheel torque command value when riding over an obstacle.

FIG. 11 is a diagram of an example of changes with time of the front wheel torque command value and the rear wheel torque command value when riding over an obstacle (a log, etc.,) present on a traveling road of the electric two-wheeled vehicle 1. A line L11 indicates the front wheel torque command value and a line L12 indicates the rear wheel torque command value.

The rider 21 operates the second switch 62 to turn off the coordinated control and select Mode 2 or Mode 4. The front wheel driving force and the rear wheel driving force can thereby be controlled independently of each other. In the same manner as in the case of FIG. 4 referenced in relation to the first embodiment described above, the rider 21 performs operations so as to raise the front wheel 3 to ride on the obstacle and thereafter apply the driving torque to the front wheel 3 to pull up the vehicle body onto the obstacle by the front wheel 3.

Specifically, the rider 21 sets the accelerator operation amount to zero to put the front wheel electric motor 13 in a state of rotating freely without generating torque and steps on the pedals 20. The rear wheel torque command value is thereby made to rise. The human force from the human powered drive system 31 and the assist force generated by the rear wheel electric motor 14 are thereby applied to the rear wheel 4. At this point, the rider 21 pulls up the handlebar 27. The front wheel 3 can thereby be raised easily. In that state, the vehicle body moves forward toward the obstacle due to the driving force (human force and assist force) applied to the rear wheel 4. The front wheel 3 can thereby be made to ride on the obstacle. After the front wheel 3 rises off the ground surface, the rider 21 operates the accelerator grip 28R to increase the accelerator operation amount. The front wheel torque command value thereby increases and the front wheel electric motor 13 generates a torque corresponding to the accelerator operation amount. Therefore, when the front wheel 3 touches down onto the obstacle and its torque is transmitted to the obstacle, the front wheel 3 pulls the vehicle body and rides on top of the obstacle.

By thus operating the pedals 20 and the accelerator grip 28R so that the front wheel driving force is generated and increased with delay after the rear driving force, the electric two-wheeled vehicle 1 can be made to ride over the obstacle easily.

The front wheel torque command value when the front wheel 3 is lifted is not required to be zero. That is, the operation of lifting the front wheel 3 is comparatively easy if the front wheel torque command value is sufficiently small and the rear wheel torque command value is sufficiently large.

Third Embodiment

Figure 12:
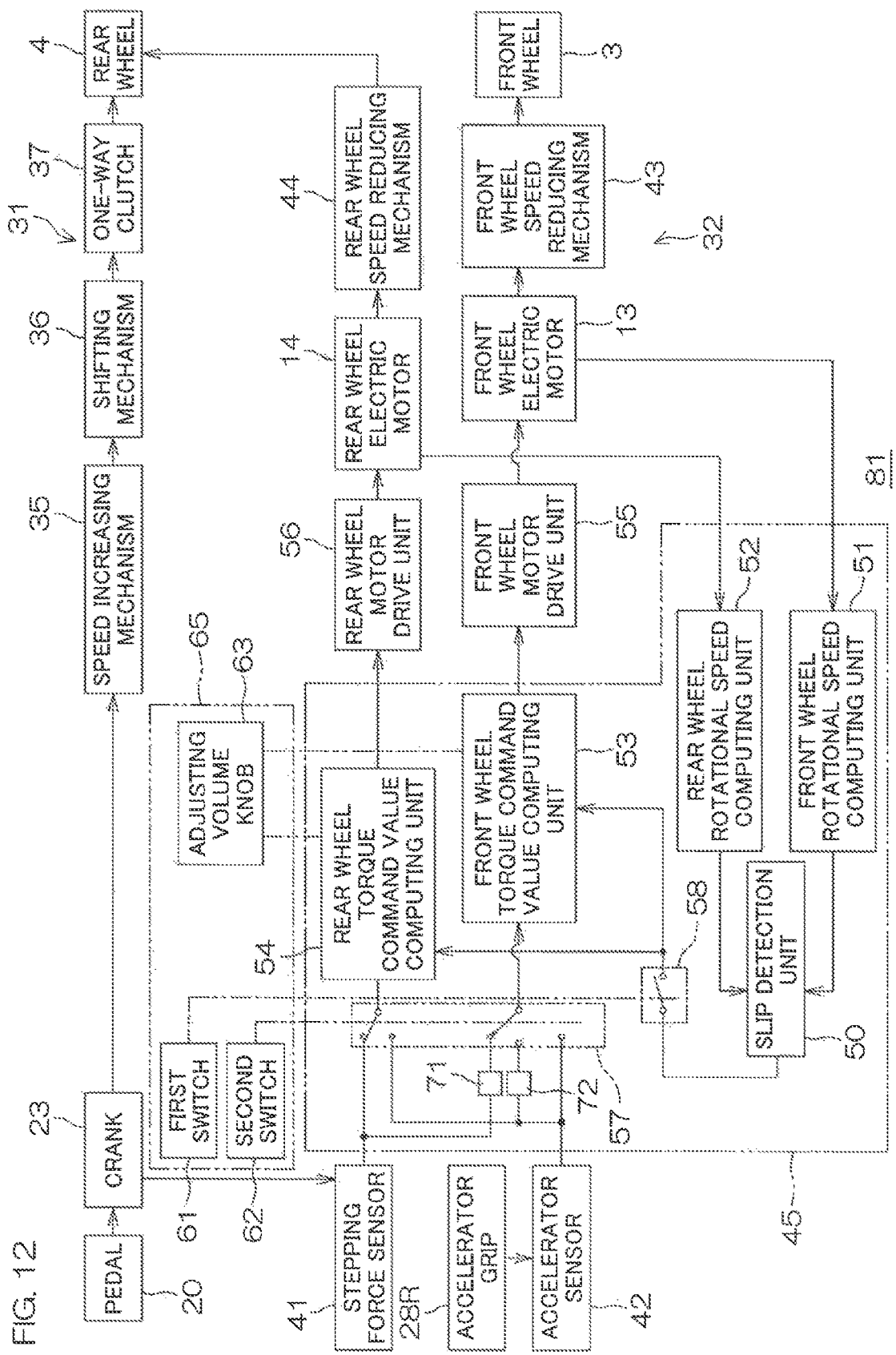
FIG. 12 is a block diagram for describing the electrical arrangement of an electric two-wheeled vehicle according to a third embodiment of the present invention.

FIG. 12 is a block diagram for describing the electrical arrangement of an electric two-wheeled vehicle 81 according to a third embodiment of the present invention. In FIG. 12, portions corresponding to the respective portions of FIG. 8 described above are indicated by the same reference symbols. Also in the description of the present embodiment, FIG. 6, FIG. 7, and FIG. 10A to FIG. 10D described above shall be referenced again.

In the present embodiment, the control unit 45 includes a first delay unit 71, which delays the output signal of the stepping force sensor 41, and a second delay unit 72, which delays the output signal of the accelerator sensor 42. That is, the control unit 45 is programmed to realize functions as the first delay unit 71 and the second delay unit 72. Embodiments of the invention encompass any circuit structure as a delay unit 71, 72, including, for example, a series of diodes, a timer element that counts to a predetermined value before generating an output signal, or any other delay element.

The first delay unit 71 may delay an inputted signal by a first predetermined time. The second delay unit 72 may delay an inputted signal by a second predetermined time. The first and second predetermined times may be equal or different. The first and second predetermined times may be set, for example, to approximately 0 seconds to 1.5 seconds (preferably approximately 0.5 seconds to 1.5 seconds). Also, the first predetermined time and/or the second predetermined time may be made adjustable by the adjusting volume knob 63 or in correspondence to an input from an operation unit other than the adjusting volume knob 63 by putting the control unit 45 in a predetermined setting mode.

Also, the first delay unit 71 may delay the inputted signal by a time required for the rear wheel 4 to rotate by a predetermined first delay rotation angle. The second delay unit 72 may delay the inputted signal by a time required for the rear wheel 4 to rotate by a predetermined second delay rotation angle. The first and second delay rotation angles may be equal or different. The first and second delay rotation angles may be set, for example, to approximately 90 degrees. Also, the first delay rotation angle and/or the second delay rotation angle may be made adjustable by the adjusting volume knob 63 or in correspondence to an input from an operation unit other than the adjusting volume knob 63 by putting the control unit 45 in the predetermined setting mode. The time required for the rear wheel 4 to rotate by the delay rotation angle may be determined from the rear wheel rotational speed computed by the rear wheel rotational speed computing unit 52. Based on the determined time, the control unit 45 sets the signal delay times at the first and second delay units 71 and 72.

The output signal of the stepping force sensor 41 may be provided to the rear wheel torque command value computing unit 54 via the sensor switching unit 57. Also, the output signal of the stepping force sensor 41 may be provided, after being delayed by the first delay unit 71, to the front wheel torque command value computing unit 53 via the sensor switching unit 57. On the other hand, the output signal of the accelerator sensor 42 may be provided to the rear wheel torque command value computing unit 54 via the sensor switching unit 57. Also, the output signal of the accelerator sensor 42 may be provided, after being delayed by the second delay unit 72, to the front wheel torque command value computing unit 53 via the sensor switching unit 57. Further, the output signal of the accelerator sensor 42 may be provided, without being delayed by the second delay unit 72, to the front wheel torque command value computing unit 53 via the sensor switching unit 57.

In the present embodiment, the sensor switching unit 57 may, for example, take on the following states.

State 1 (shown in FIG. 12): The output signal of the stepping force sensor 41 is provided to both the front wheel torque command value computing unit 53 and the rear wheel torque command value computing unit 54 and the output signal of the accelerator sensor 42 is not provided to either of the torque command value computing units 53 and 54. The output signal of the stepping force sensor 41 is provided to the front wheel torque command value computing unit 53 upon being delayed by the first delay unit 71.

State 2: The output signal of the stepping force sensor 41 is provided to the rear wheel torque command value computing unit 54 and the output signal of the accelerator sensor 42 is provided to the front wheel torque command value computing unit 53 without being delayed by the delay units 71 and 72.

State 3: The output signal of the stepping force sensor 41 is not provided to either of the torque command value computing units 53 and 54 and the output signal of the accelerator sensor 42 is provided to both the front wheel torque command value computing unit 53 and the rear wheel torque command value computing unit 54. The output signal of the accelerator sensor 42 is provided to the front wheel torque command value computing unit 53 upon being delayed by the second delay unit 72.

The sensor switching unit 57 is switched by operation of the first switch 61 of the remote control unit 65. Specifically, State 1 or State 3 is entered when the coordinated control is activated by the first switch 61. Which of the states is entered will be in accordance with the program of the control unit 45. The sensor switching unit 57 is in State 2 when the coordinated control is inactivated.

Arrangements besides the above are the same as in the second embodiment described above.

As in the second embodiment, the control unit 45 has the control modes of Mode 1 to Mode 4.

Figure 13:
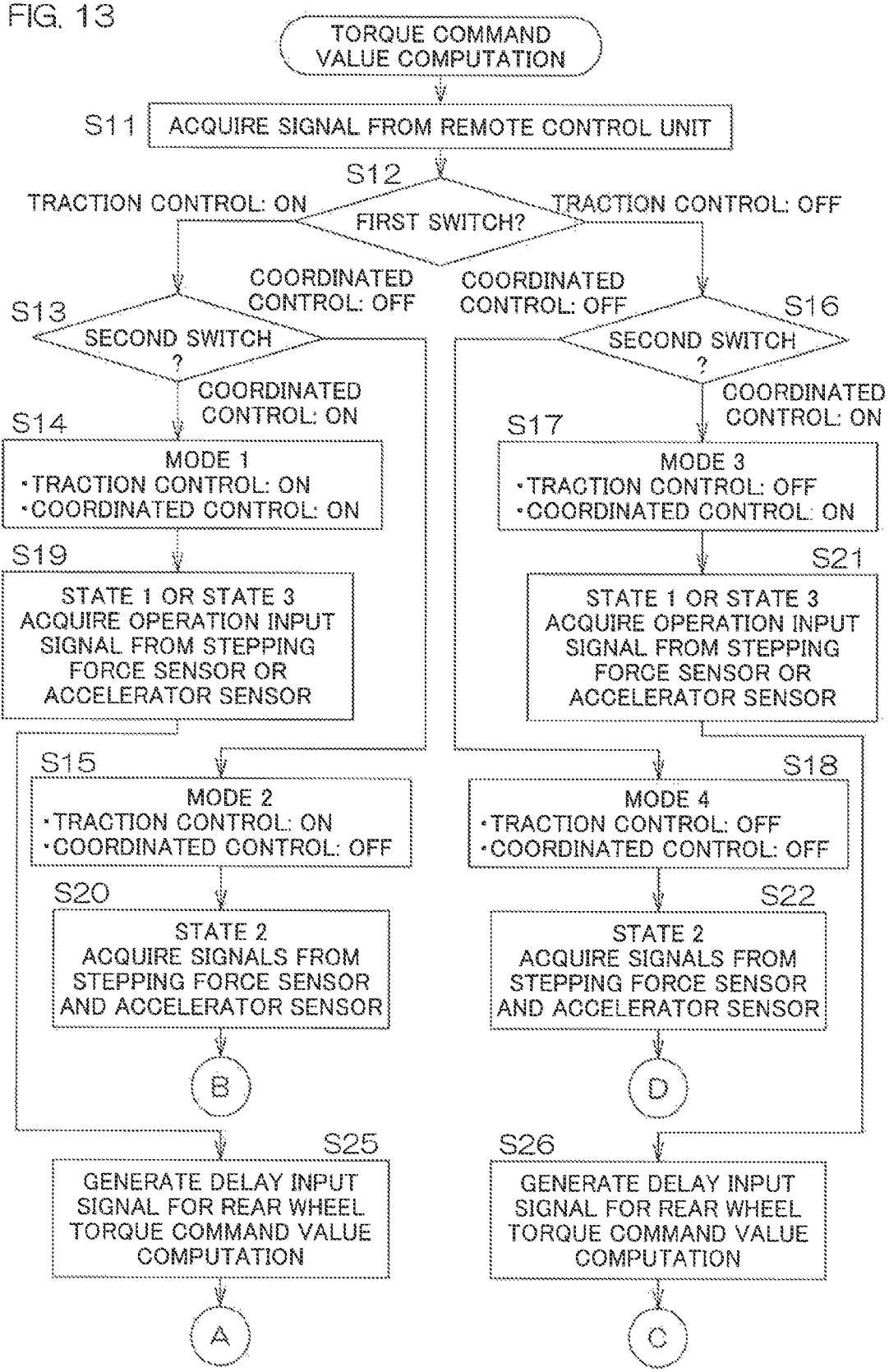
FIG. 13 is a flowchart for describing an example of control of the front wheel electric motor and the rear wheel electric motor.

A processing example of the control unit 45 related to the control of the front wheel electric motor 13 and the rear wheel electric motor 14 shall now be described with reference to FIG. 13 and FIG. 10A to FIG. 10D described above. In FIG. 13, steps in which the same processing as the respective steps shown in FIG. 9 described above are performed shall be provided with the same reference symbol.

The control unit 45 acquires the signals from the remote control unit 65. Specifically, the control unit 45 acquires the states of the first switch 61 and the second switch 62 and the operation amount of the adjusting volume knob 63 (step S11). In correspondence to the states of the first and second switches 61 and 62 (steps S12, S13, and S16), the control unit 45 generates the torque command values for the front wheel electric motor 13 and the rear wheel electric motor 14 in accordance with a control mode among Modes 1 to 4 (step S14, S15, S17, and S18).

When Mode 1 is selected, the control unit 45 controls the sensor switching unit 57 to be in State 1 or State 3 described above (step S19). The output signal of the stepping force sensor 41 or the accelerator sensor 42 is thereby used as the operation input signal to generate the front wheel torque command value and the rear wheel torque command value. The traction control switching unit 58 is put in the on state. If the sensor switching unit 57 is in State 1, the control unit 45 delays the output signal (operation input signal) of the stepping force sensor 41 by means of the first delay unit 71 (step S25). Also, if the sensor switching unit 57 is in State 3, the control unit 45 delays the output signal (operation input signal) of the accelerator sensor 42 by means of the second delay unit 72.

Other operations in Mode 1 are as shown in FIG. 10A. The front wheel torque command value is computed based on the delayed operation input signal (steps S37, S38, and S39).

When Mode 2 is selected, the control unit 45 controls the sensor switching unit 57 to be in State 2 described above. Both the output signal of the accelerator sensor 42 and the output signal of the stepping force sensor 41 are thereby acquired (step S20). The traction control switching unit 58 is put in the on state. In this case, for example, the traction control is performed just for the rear wheel 4.

Other operations in Mode 2 are as shown in FIG. 10B. The output signal of the accelerator sensor 42 is provided to the front wheel torque command value computing unit 53 without being delayed by the second delay unit 72. That is, the front wheel driving torque command value is computed based on the accelerator sensor output signal (operation input signal) that is not delayed. Also, the output signal of the stepping force sensor 41 is input into the rear wheel torque command value computing unit 54. The rear wheel torque command value is computed based on the output signal (operation input signal) of the stepping force sensor 41. The front wheel torque command value and the rear wheel torque command value are thus generated based on different operation input signals.

When Mode 3 is selected, the control unit 45 controls the sensor switching unit 57 to be in State 1 or State 3 described above. The output signal of the stepping force sensor 41 or the accelerator sensor 42 is thereby used as the operation input signal to generate the front wheel torque command value and the rear wheel torque command value. The traction control switching unit 58 is put in the off state. If the sensor switching unit 57 is in State 1, the control unit 45 delays the output signal (operation input signal) of the stepping force sensor 41 by means of the first delay unit 71. Also, if the sensor switching unit 57 is in State 3, the control unit 45 delays the output signal (operation input signal) of the accelerator sensor 42 by means of the second delay unit 72.

Other operations in Mode 3 areas shown in FIG. 10C. The front wheel driving torque command value is computed based on the delayed operation input signal.

When Mode 4 (traction control: off, coordinated control: off) is selected, the control unit 45 controls the sensor switching unit 57 to be in State 2 described above. Both the output signal of the accelerator sensor 42 and the output signal of the stepping force sensor 41 are thereby acquired (step S22). The traction control switching unit 58 is put in the off state. The traction control is thus not performed for either of the front wheel 3 and the rear wheel 4.

Other operations in Mode 4 are as shown in FIG. 10D. The output signal of the accelerator sensor 42 is input into the front wheel torque command value computing unit 53 without being delayed by the second delay unit 72. That is, the front wheel torque command value is generated based on the accelerator sensor output signal (operation input signal) that is not delayed. Also, the output signal of the stepping force sensor 41 is input into the rear wheel torque command value computing unit 54. The rear wheel torque command value is computed based on the output signal (operation input signal) of the stepping force sensor 41. The front wheel torque command value and the rear wheel torque command value are thus generated based on different operation input signals.

Operations performed when riding over an obstacle (a log, etc.,) present on a traveling road of the electric two-wheeled vehicle 81 shall now be described. The operations performed when Mode 2 or Mode 4 is selected are the same as in the case of the second embodiment described above.

In the present embodiment, even in Mode 1 and Mode 3, in which the coordinated control is executed, the driving torque of the front wheel 3 can be generated or increased with delay after the generation or increase of the driving torque of the rear wheel 4. The vehicle can thus be made to move forward upon riding over an obstacle easily even in Mode 1 and Mode 3.

The rider 21 makes the front wheel 3 rise and ride on the obstacle and thereafter operates so as to make the driving torque be applied to the front wheel 3 and make the vehicle body be pulled up onto the obstacle by the front wheel 3.

Figure 14:
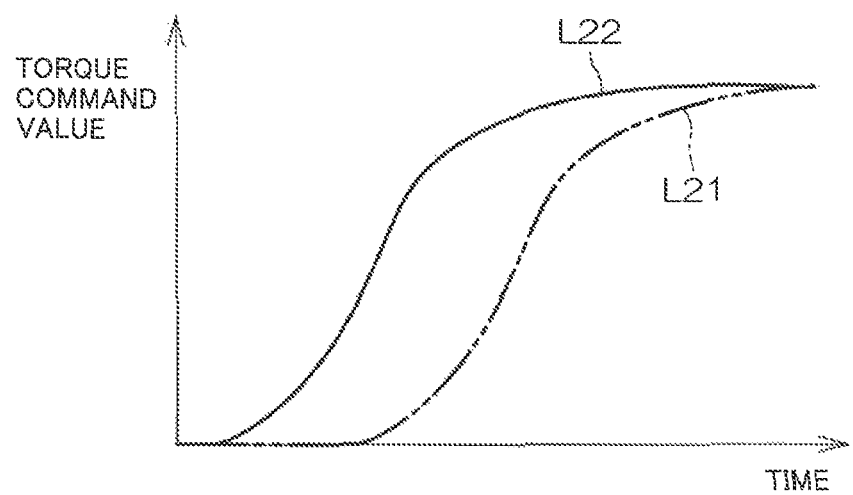
FIG. 14 is a diagram of an example of changes with time of the front wheel torque command value and the rear wheel torque command value when riding over an obstacle.

For example, if the sensor switching unit 57 is in State 1, the obstacle can be ridden over easily by operating as follows. Specifically, the rider 21 makes the pedal stepping force zero once to stop the generation of the driving torque from the front wheel electric motor 13 and put the front wheel 3 in the freely rotating state. From that state, the rider 21 stepson the pedals 20. The rear wheel torque command value thereby rises as indicated by the line L22 of FIG. 14 and the human force from the human powered drive system 31 and the assist force generated by the rear wheel electric motor 14 are applied to the rear wheel 4. On the other hand, the front wheel torque command value is maintained at zero as indicated by the line L21 of FIG. 14 and the front wheel 3 is maintained in the freely rotating state while the stepping force sensor output signal is delayed by the first delay unit 71.

The rider 21 makes use of the delay time to pull up the handlebar 27. The front wheel 3 can thereby be raised easily. The vehicle body is moved forward toward the obstacle by the driving force (human force and assist force) applied to the rear wheel 4, and the front wheel 3 can thus be made to ride on the obstacle. After the front wheel 3 rises off the ground surface, the front wheel torque command value rises and the front wheel torque command value corresponding to the delayed stepping force sensor output is generated. Correspondingly, the front wheel electric motor 13 generates a torque corresponding to the stepping force sensor output. Therefore, when the front wheel 3 touches down onto the obstacle and its torque is transmitted to the obstacle, the front wheel 3 pulls the vehicle body and rides on top of the obstacle. The front wheel driving force is thus generated and increased with delay after the rear wheel driving force and therefore the electric two-wheeled vehicle 81 can ride over the obstacle easily.

If the sensor switching unit 57 is in State 3, the obstacle can be ridden over easily by operating as follows. For example, the rider 21 puts the accelerator grip 28R in an initial position to make the accelerator operation amount zero to stop the generation of the driving torque from the front wheel electric motor 13 and put the front wheel 3 in the freely rotating state. From that state, the rider 21 operates the accelerator grip 28R to increase the accelerator operation amount. The rear wheel torque command value rises correspondingly and the rear wheel electric motor 14 thus generates torque and drives the rear wheel 3. On the other hand, the front wheel torque command value is maintained at zero and the front wheel 3 is maintained in the freely rotating state while the accelerator sensor output signal is delayed by the second delay unit 72.

The rider 21 makes use of the delay time to pull up the handlebar 27. The front wheel 3 can thereby be raised easily. The vehicle body is moved forward toward the obstacle by the driving force applied from the rear wheel electric motor 14 to the rear wheel 4, and the front wheel 3 can thus be made to ride on the obstacle. After the front wheel 3 rises off the ground surface, the front wheel torque command value rises and the front wheel torque command value corresponding to the delayed accelerator sensor output is generated. Therefore with delay after the increase of the rear wheel torque command value, front wheel torque command value increases and a torque corresponding to the front wheel torque command value is generated from the front wheel electric motor 13. Therefore, when the front wheel 3 touches down onto the obstacle and its torque is transmitted to the obstacle, the front wheel 3 pulls the vehicle body and rides on top of the obstacle. The front wheel driving force is thus generated and increased with delay after the rear wheel driving force and therefore the electric two-wheeled vehicle 81 can ride over the obstacle easily.

The accelerator operation amount does not necessarily have to be set to zero before lifting the front wheel 3 and may be set to a minute value greater than zero instead.

As mentioned above, the delay times or the delay rotation angles at the delay units 71 and 72 may be adjusted by the adjusting volume knob 63 upon putting the control unit 45 in the setting mode. Thus with the present embodiment, the adjusting volume knob 63 is an example of a time difference adjusting unit that outputs a time difference command signal. The control unit 45 variably sets the delay times or the delay rotation angles at the delay units 71 and 72 in accordance with the command from the adjusting volume knob 63 and thereby variably sets the time difference between the driving force increases of the front wheel electric motor 13 and the rear wheel electric motor 14.

Fourth Embodiment

Figure 15:
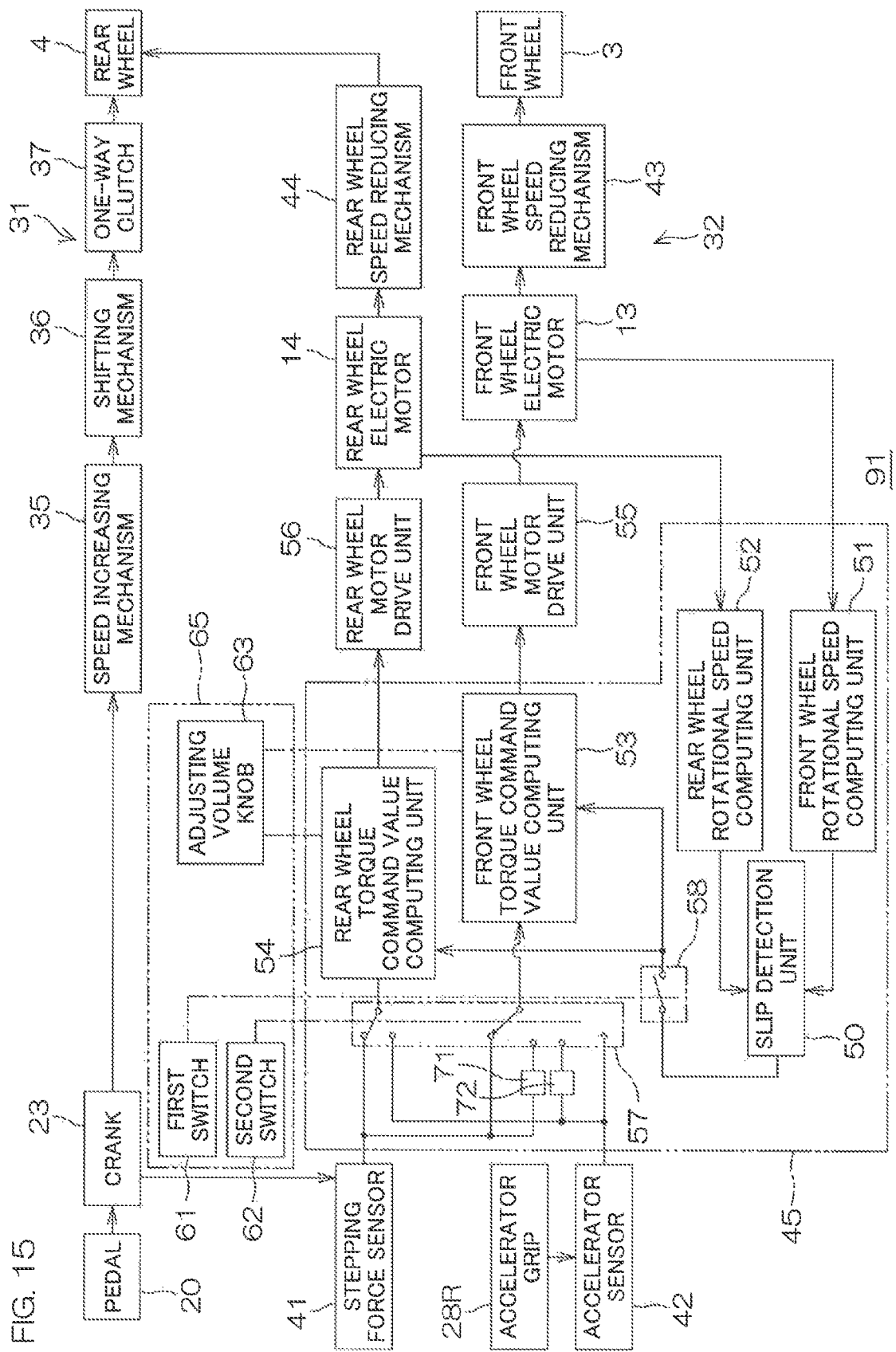
FIG. 15 is a block diagram for describing the electrical arrangement of an electric two-wheeled vehicle according to a fourth embodiment of the present invention.

FIG. 15 is a block diagram for describing the electrical arrangement of an electric two-wheeled vehicle 91 according to a fourth embodiment of the present invention. In FIG. 15, portions corresponding to the respective portions of FIG. 12 described above are indicated by the same reference symbols. Also in the description of the present embodiment, FIG. 6, FIG. 7, etc., described above shall be referenced again.

In the present embodiment, the sensor switching unit 57 is arranged to be capable of providing the output signal of the stepping force sensor 41 to the front wheel torque command value computing unit 53 without delay by the first delay unit 71. Also, the second switch 62, switching on/off the coordinated control, is arranged to enable selection among a first coordinated control on state, a second coordinated control on state, and a coordinated control off state, and the sensor switching unit 57 is capable of taking on states corresponding to these.

Specifically, the sensor switching unit 57 may take on the following states.

State 1-1 (shown in FIG. 15): The output signal of the stepping force sensor 41 is provided to both the front wheel torque command value computing unit 53 and the rear wheel torque command value computing unit 54 and the output signal of the accelerator sensor 42 is not provided to either of the torque command value computing units 53 and 54. The output signal of the stepping force sensor 41 is provided to the front wheel torque command value computing unit 53 without being delayed by the first delay unit 71.

State 1-2: The output signal of the stepping force sensor 41 is provided to both the front wheel torque command value computing unit 53 and the rear wheel torque command value computing unit 54 and the output signal of the accelerator sensor 42 is not provided to either of the torque command value computing units 53 and 54. The output signal of the stepping force sensor 41 is provided to the front wheel torque command value computing unit 53 upon being delayed by the first delay unit 71.

State 2: The output signal of the stepping force sensor 41 is provided to the rear wheel torque command value computing unit 54 and the output signal of the accelerator sensor 42 is provided to the front wheel torque command value computing unit 53 without being delayed by the delay units 71 and 72.

State 3-1: The output signal of the stepping force sensor 41 is not provided to either of the torque command value computing units 53 and 54 and the output signal of the accelerator sensor 42 is provided to both the front wheel torque command value computing unit 53 and the rear wheel torque command value computing unit 54. The output signal of the accelerator sensor 42 is provided to the front wheel torque command value computing unit 53 without being delayed by the second delay unit 72.

State 3-2: The output signal of the stepping force sensor 41 is not provided to either of the torque command value computing units 53 and 54 and the output signal of the accelerator sensor 42 is provided to both the front wheel torque command value computing unit 53 and the rear wheel torque command value computing unit 54. The output signal of the accelerator sensor 42 is provided to the front wheel torque command value computing unit 53 upon being delayed by the second delay unit 72.

When the first coordinated control on state is selected by the second switch 62, the sensor switching unit 57 is set to State 1-1 or State 3-1. Which of the states is entered will be in accordance with the setting of the program of the control unit 45. When the second coordinated control on state is selected by the second switch 62, the sensor switching unit 57 is set to State 1-2 or State 3-2. Which of the states is entered will be in accordance with the setting of the program of the control unit 45. When the coordinated control off state is selected by the second switch 62, the sensor switching unit 57 is set to State 2.

State 1-2 corresponds to State 1 in the second embodiment described above, and State 3-2 corresponds to State 3 in the second embodiment described above.

In State 1-1, the output signal (operation input signal) of the stepping force sensor 41 is supplied to the front wheel torque command value computing unit 53 and the rear wheel torque command value computing unit 54 at the same timing. Therefore in response to an operation of stepping on the pedals 20, the front wheel electric motor 13 and the rear wheel electric motor 14 generate torques at the same time and increase torques at the same time.

In State 3-1, the output signal (operation input signal) of the accelerator sensor 42 is supplied to the front wheel torque command value computing unit 53 and the rear wheel torque command value computing unit 54 at the same timing. Therefore in response to an operation of the accelerator grip 28R, the front wheel electric motor 13 and the rear wheel electric motor 14 generate torques at the same time and increase torques at the same time.

In Mode 1 and Mode 3, in which the coordinated control is active, the sensor switching unit 57 is set, in correspondence to the selection operation by the second switch 62, to State 1-1 or State 1-2 instead of State 1 in the second embodiment. Also, in Mode 1 and Mode 3, the sensor switching unit 57 is set, in correspondence to the selection operation by the second switch 62, to State 3-1 or State 3-2 instead of State 3 in the second embodiment.

Thus in the present embodiment, selection can be made between delaying and not delaying the operation input signal used in common to compute the front wheel torque command value and the rear wheel torque command value when the coordinated control is active. The rider 21 can thereby select between a time difference drive mode, in which the front wheel driving force is generated and increased with delay after the rear wheel driving force, and a synchronized drive mode, in which the front wheel driving force and the rear wheel driving force are generated and increased in synchronization. The switching between the time difference drive mode and the synchronized drive mode can be performed by operation of the second switch 62. That is, the second switch 62 is an example of a mode switching operation unit that is operated by an operator to switch between the time difference drive mode and the synchronized drive mode. In the above-described embodiment, the sensor switching unit 57 may comprise transistors or other solid state switches, or physical switches with an arm that is moved to connect to separate electrical paths.

Other Embodiments

Although four embodiments have been described above, the present invention may be implemented in yet other modes. Some variations are described as examples below.

1. Although in each of the embodiments described above, a two-wheeled vehicle, having one front wheel and one rear wheel, has been described as an example of a straddled vehicle, it suffices that with each of the front wheel and the rear wheel, the number of vehicle wheels is not less than one. That is, there may be a plurality of front wheels, and similarly, there may be a plurality of rear wheels. As an example of a straddled vehicle having a plurality of front wheels or rear wheels, an ATV (all-terrain vehicle) can be cited.

2. In each of the embodiments described above, an accelerator pedal, an accelerator grip, and foot-pedals have been described as examples of an operation input unit for computing the torque command value. However, an operation input unit of another form, such as an accelerator lever, etc., may be used.

3. In each of the embodiments described above, the front wheel electric motor and the rear wheel electric motor are controlled by a single control unit. However, two control units, respectively corresponding to the front wheel electric motor and the rear wheel electric motor, may be included.

4. In each of the second, third, and fourth embodiments, the human powered drive system 31 may be omitted. Specifically, the speed increasing mechanism 35, the shifting mechanism 36, and the one-way clutch 37 may be omitted. In this case, a rotational resistance unit, that imparts a rotational resistance to the crank 23, is preferably included. By this arrangement, the stepping force applied to the pedals 20 is detected by the stepping force sensor 41 and the pedals 20 may thus be used as a rear wheel input unit. A rear wheel driving force corresponding to the stepping force applied to the pedals 20 can thus be generated from the rear wheel 4.

5. The human powered drive system 31 does not have to include the one-way clutch 37.

6. In the first embodiment, when the accelerator pedal 130 and the accelerator grip 110 are operated at the same time or with a time difference within a fixed time, the control unit 140 may first make the rear wheel torque command value be generated or increase and thereafter make the front wheel torque command value be generated or increase after a delay time determined in advance. And if the accelerator pedal 130 and the accelerator grip 110 are operated with a time difference exceeding the fixed time, the control unit 140 may make the rear wheel torque command value be generated or increase at an operation timing of the accelerator pedal 130 and make the front wheel torque command value be generated or increase at an operation timing of the accelerator grip 110.

The same applies to Mode 2 and Mode 4 in the second, third, and fourth embodiments. That is, when the pedals 20 and the accelerator grip 28R are operated at the same time or with a time difference within a fixed time, the control unit 45 may first make the rear wheel torque command value be generated or increase and thereafter make the front wheel torque command value be generated or increase after a delay time determined in advance. And if the pedals 20 and the accelerator grip 28R are operated with a time difference exceeding the fixed time, the control unit 45 may make the rear wheel torque command value be generated or increase at an operation timing of the pedals 20 and make the front wheel torque command value be generated or increase at an operation timing of the accelerator grip 28R.

7. In the third and fourth embodiment, each of the delay units 71 and 72 may always delay the input signal but may also be arranged to delay the input signal when a predetermined condition is established. Specifically, each of the delay units 71 and 72 may delay the input signal just in a low speed rotation state, in which the front wheel rotational speed and/or the rear wheel rotational speed are or is not more than a predetermined threshold, or in a stopped state. The driving of the front wheel can be delayed from the driving of the rear wheel just when an operation input (accelerator operation or pedal stepping-on operation) is performed in the low speed rotation state or the stopped state.

In each of the embodiments described above, an example where the rear wheel torque command value is generated or increased and the front wheel torque command value is generated or increased thereafter has been mainly described. However, the front wheel torque command value may instead be decreased after generating or increasing the rear wheel torque command value. For example, in the first embodiment, the user may step on the accelerator pedal 130 to increase the rear wheel torque command value and thereafter make the front wheel torque command value increase in a negative direction (that is, decrease) by operation of the accelerator grip 110. In this case, while the rear wheel electric motor 114 is put in a power running state and imparts a torque in a forward rotation direction to the rear wheel 104, the front wheel electric motor 113 is put in a regenerative state and imparts a torque in a reverse rotation direction to the front wheel 103. By this arrangement, for example, when the front wheel 103 slips on the obstacle 100, the grip of the front wheel 103 can be recovered. When the grip of the front wheel 103 is recovered, the user may make the front wheel torque command value a positive value by operation of the accelerator grip 110 to put the front wheel electric motor 113 in the power running state and make a torque of the forward rotation direction be generated from the front wheel 103. Even when a positive front wheel torque command value is being generated as indicated by the line L1 in FIG. 5, if a slip occurs in the front wheel 103, the user may decrease the front wheel torque command value and make it be of a negative value by operation of the accelerator grip 110. The front wheel electric motor 113 can thereby put in the regenerative state to make a torque of the reverse rotation direction be generated from the front wheel 103 and achieve grip recovery of the front wheel 103. The same operations are possible with the second embodiment as well. Also in the third and fourth embodiments, it is not necessary for the front wheel torque command value (the line L21 in FIG. 14) to rise monotonously and, for example, a positive or negative front wheel torque command value may be generated or the front wheel torque command value may be increased or decreased in correspondence to a slipping state of the front wheel 103.

While embodiments of the present invention have been described in detail above, these are merely specific examples used to clarify the technical contents of the present invention, and the present invention should not be interpreted as being limited only to these specific examples, and the spirit and scope of the present invention shall be limited only by the appended claims.

REFERENCE NUMERAL LIST

101: Electric two-wheeled vehicle (first embodiment)
102: Vehicle body frame
103: Front wheel
104: Rear wheel
107: Handlebar
110: Accelerator grip
111: Seat
112: Battery
113: Front wheel electric motor
114: Rear wheel electric motor
130: Accelerator pedal
140: Control unit
141: Front wheel torque command value computing unit
142: Rear wheel torque command value computing unit
143: Front wheel motor drive unit
144: Rear wheel motor drive unit
153: Front wheel accelerator sensor
154: Rear wheel accelerator sensor
1: Electric two-wheeled vehicle (second embodiment)
2: Vehicle body frame
3: Front wheel
4: Rear wheel
11: Saddle
12: Battery
13: Front wheel electric motor
14: Rear wheel electric motor
20: Pedal
21: Driver
23: Crank
27: Handlebar
28R: Accelerator grip
31: Human powered drive system
32: Electric drive system
41: Stepping force sensor
42: Accelerator sensor
45: Control unit
50: Slip detection unit
53: Front wheel torque command value computing unit
54: Rear wheel torque command value computing unit
55: Front wheel motor drive unit
56: Rear wheel motor drive unit
57: Sensor switching unit
58: Traction control switching unit
61: First switch
62: Second switch
63: Adjusting volume knob
65: Remote control unit
71: First delay unit
72: Second delay unit
81: Electric two-wheeled vehicle (third embodiment)
91: Electric two-wheeled vehicle (fourth embodiment)

The invention claimed is:

1. A straddled vehicle comprising:
a straddled vehicle body;
a front wheel that supports the vehicle body;
a rear wheel that supports the vehicle body;
a front wheel electric motor that imparts a driving force to the front wheel;
a rear wheel electric motor that imparts a driving force to the rear wheel;
a front wheel motor drive unit that drives the front wheel electric motor;
a rear wheel motor drive unit that drives the rear wheel electric motor; and
a control unit, programmed to provide a front wheel drive command to the front wheel motor drive unit and to provide a rear wheel drive command, differing from the front wheel drive command, to the rear wheel motor drive unit so as to provide a time difference in changes of the driving forces of the front wheel electric motor and the rear wheel electric motor.

2. The straddled vehicle according to claim 1, wherein the control unit is programmed to generate the front wheel drive command and the rear wheel drive command so that the change of the driving force of the front wheel electric motor occurs after a delay after the change of the driving force of the rear wheel electric motor.

3. The straddled vehicle according to claim 2, wherein the control unit is programmed to generate the front wheel drive command and the rear wheel drive command so that an increase of the driving force of the front wheel electric motor occurs after a delay after an increase of the driving force of the rear wheel electric motor.

4. The straddled vehicle according to claim 3, wherein the control unit is programmed to generate the front wheel drive command and the rear wheel drive command so that the driving force of the front wheel electric motor is generated after a delay after driving force generation of the rear wheel electric motor.

5. The straddled vehicle according to any of claim 4, further comprising:
   a front wheel input unit that is operated by a user and that outputs a signal corresponding to an operation by the user; and
   a rear wheel input unit that is operated by the user and that outputs a signal corresponding to the operation by the user,
   wherein the control unit is programmed to generate the front wheel drive command in correspondence to the input from the front wheel input unit and generate the rear wheel drive command based on the input from the rear wheel input unit.

6. The straddled vehicle according to claim 5, wherein the rear wheel input unit includes a pedal that is stepped on by the user, and a stepping force sensor that detects a stepping force applied to the pedal and outputs a signal corresponding to the stepping force, and
   the straddled vehicle further comprises a human-powered drive mechanism that transmits the stepping force, applied to the pedal, to the rear wheel.

7. The straddled vehicle according to claim 6, wherein the control unit is programmed to generate the front wheel drive command and the rear wheel drive command so that by the user operating the front wheel input unit with delay after an operation of the rear wheel input unit, the change of the driving force of the front wheel electric motor occurs after a delay after the change of the driving force of the rear wheel electric motor based on the operations.

8. The straddled vehicle according to claim 7, wherein the control unit is programmed to generate the front wheel drive command and the rear wheel drive command so that by the user operating the front wheel input unit with the delay after as the operation of the rear wheel input unit, an increase of the driving force of the front wheel electric motor occurs after a delay after an increase of the driving force of the rear wheel electric motor based on the operations.

9. The straddled vehicle according to any of claim 8, wherein the control unit is programmed to generate the front wheel drive command and the rear wheel drive command so that by the user operating the front wheel input unit with the delay after the operation of the rear wheel input unit, the driving force of the front wheel electric motor is generated after a delay after driving force generation of the rear wheel electric motor based on the operations.

10. The straddled vehicle according to any of claim 9, wherein
    the control unit is configured to operate in an individual control mode and a common control mode,
    the control unit is programmed to generate the front wheel drive command based on an input from the front wheel input unit and to generate the rear wheel drive command based on an input from the rear wheel input unit in the individual control mode, and
    the control unit is programmed to generate the front wheel drive command and the rear wheel drive command based on the input from one of the front wheel input unit and the rear wheel input unit in the common control mode, and
    the straddled vehicle further comprises a mode switching operation unit that is operated by the user and that switches between the individual control mode and the common control mode.

11. The straddled vehicle according to any of claim 1, further comprising:
    an input unit that is operated by the user and that outputs a signal based on an operation by the user,
    wherein the control unit is programmed to generate the front wheel drive command and the rear wheel drive command so as to provide a time difference in changes of the driving forces of the front wheel electric motor and the rear wheel electric motor based on the input from the input unit.

12. The straddled vehicle according to claim 11, wherein
    the control unit has a synchronized drive mode and a time difference drive mode,
    the control unit is programmed to generate, in the synchronized drive mode, the front wheel drive command and the rear wheel drive command so that changes of the driving forces of the front wheel electric motor and the rear wheel electric motor occur in synchronization it based on an input from the input unit,
    the control unit is programmed to generate, in the time difference drive mode, the front wheel drive command and the rear wheel drive command so as to provide a time difference in changes of the driving forces of the front wheel electric motor and the rear wheel electric motor based on an input from the input unit, and
    the straddled vehicle further comprises a mode switching operation unit that is operated by the user and that switches between the synchronized drive mode and the time difference drive mode.

13. The straddled vehicle according to claim 12, further comprising:
    a time difference adjusting unit, operated by the user to adjust the time difference,
    wherein the control unit is programmed to variably set the time difference in correspondence to a time difference command signal input from the time difference adjusting unit.

14. The straddled vehicle according to claim 1, wherein the control unit is programmed to generate the front wheel drive command and the rear wheel drive command so that the driving force of the front wheel electric motor is generated after a delay after driving force generation of the rear wheel electric motor.

15. The straddled vehicle according to claim 1, wherein the control unit is programmed to generate the front wheel drive command and the rear wheel drive command so that the change of the driving force of the front wheel electric motor occurs after a delay after the change of the driving force of the rear wheel electric motor, and
    wherein the control unit is programmed to generate the front wheel drive command and the rear wheel drive command so that the driving force of the front wheel electric motor is generated after a delay after driving force generation of the rear wheel electric motor.

16. The straddled vehicle according to claim 1, further comprising:
    a front wheel input unit that is operated by a user and that outputs a signal corresponding to the operation; and
    a rear wheel input unit that is operated by the user and that outputs a signal corresponding to the operation,
    wherein the control unit is programmed to generate the front wheel drive command based on the input from the front wheel input unit and generate the rear wheel drive command based on the input from the rear wheel input unit.

17. The straddled vehicle according to claim 1, further comprising:

a front wheel input unit that is operated by a user and that outputs a signal corresponding to the operation; and a rear wheel input unit that is operated by the user and that outputs a signal corresponding to the operation, wherein the control unit is programmed to generate the front wheel drive command based on the input from the front wheel input unit and to generate the rear wheel drive command based on the input from the rear wheel input unit, and wherein the control unit is programmed to generate the front wheel drive command and the rear wheel drive command so that the change of the driving force of the front wheel electric motor occurs after a delay after the change of the driving force of the rear wheel electric motor.

18. The straddled vehicle according to claim 1, further comprising:

a front wheel input unit that is operated by a user and that outputs a signal corresponding to the operation; and a rear wheel input unit that is operated by the user and that outputs a signal corresponding to the operation, wherein the control unit is programmed to generate the front wheel drive command based on the input from the front wheel input unit and generate the rear wheel drive command based on the input from the rear wheel input unit, wherein the control unit is programmed to generate the front wheel drive command and the rear wheel drive command so that the change of the driving force of the front wheel electric motor occurs after a delay after the change of the driving force of the rear wheel electric motor, and wherein the control unit is programmed to generate the front wheel drive command and the rear wheel drive command so that an increase of the driving force of the front wheel electric motor occurs after a delay after an increase of the driving force of the rear wheel electric motor.

19. The straddled vehicle according to claim 1, further comprising:

an input unit that is operated by the user and that outputs a signal based on an operation by the user, wherein the control unit is programmed to generate the front wheel drive command and the rear wheel drive command so as to provide a time difference in changes of the driving forces of the front wheel electric motor and the rear wheel electric motor based on the input from the input unit, and wherein the control unit is programmed to generate the front wheel drive command and the rear wheel drive command so that the change of the driving force of the front wheel electric motor occurs after a delay after the change of the driving force of the rear wheel electric motor.

20. The straddled vehicle according to claim 19, wherein the control unit is programmed to generate the front wheel drive command and the rear wheel drive command so that an increase of the driving force of the front wheel electric motor occurs after a delay after an increase of the driving force of the rear wheel electric motor.

* * * * *